(12) United States Patent
Shen et al.

(10) Patent No.: US 11,904,581 B2
(45) Date of Patent: Feb. 20, 2024

(54) BIFUNCTIONAL FILM

(71) Applicant: Industrial Technology Research Institute, Hsinchu (TW)

(72) Inventors: Hsin-Hsin Shen, Zhudong Township (TW); Yu-Chi Wang, New Taipei (TW); Ming-Chia Yang, Zhudong Township (TW); Yu-Bing Liou, Hsinchu (TW); Wei-Hong Chang, Linnei Township (TW); Yun-Han Lin, Taichung (TW); Hsin-Yi Hsu, Taoyuan (TW); Yun-Chung Teng, Kaohsiung (TW); Chia-Jung Lu, Taichung (TW); Yi-Hsuan Lee, Taipei (TW); Jian-Wei Lin, Tainan (TW); Kun-Mao Kuo, Tainan (TW); Ching-Mei Chen, Tainan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 17/885,874

(22) Filed: Aug. 11, 2022

(65) Prior Publication Data
US 2022/0388293 A1 Dec. 8, 2022

Related U.S. Application Data

(62) Division of application No. 16/675,838, filed on Nov. 6, 2019, now Pat. No. 11,458,715.
(Continued)

(51) Int. Cl.
B32B 27/36 (2006.01)
B32B 27/24 (2006.01)
(Continued)

(52) U.S. Cl.
CPC ............... *B32B 27/36* (2013.01); *B05D 5/08* (2013.01); *B05D 7/544* (2013.01); *B05D 7/584* (2013.01);
(Continued)

(58) Field of Classification Search
None
See application file for complete search history.

(56) References Cited

U.S. PATENT DOCUMENTS 8,097,274 B2  1/2012  Coombes et al.
8,128,779 B2  3/2012  Ho et al.
(Continued)

FOREIGN PATENT DOCUMENTS

CN  101257935 A  9/2008
CN  101507661 A  8/2009
(Continued)

OTHER PUBLICATIONS

Choi et al.; Human Gelatin Tissue-Adhesive Hydrogels Prepared by Enzyme-Mediated Biosynthesis of DOPA and Fe3+ ion Crosslinking; Journal of Materials Chemistry B; 2014, 2, 201.*
(Continued)

*Primary Examiner* — Michael P. Rodriguez
(74) *Attorney, Agent, or Firm* — Birch, Stewart, Kolasch & Birch, LLP

(57) ABSTRACT

A method for preparing a bifunctional film, including: (a) drying a first polymer solution to form a film to form an anti-adhesion layer, and (b) drying a second polymer solution over the anti-adhesion layer to form a film to form an attachment layer. The first polymer solution includes a first hydrophobic solution and a first hydrophilic solution, and in the first polymer solution, the weight ratio of the solute of the first hydrophobic solution to the solute of the first
(Continued)

hydrophilic solution is 1:0.01-1. Moreover, the second polymer solution is composed of a second hydrophilic solution.

12 Claims, 19 Drawing Sheets

Related U.S. Application Data

(60) Provisional application No. 62/756,777, filed on Nov. 7, 2018.

(51) Int. Cl.
    *B32B 27/30*     (2006.01)
    *B05D 7/00*     (2006.01)
    *B05D 5/08*     (2006.01)
    *B32B 38/00*     (2006.01)
    *B32B 37/02*     (2006.01)
    *B32B 38/16*     (2006.01)
    *B32B 37/26*     (2006.01)

(52) U.S. Cl.
    CPC ............ *B32B 27/24* (2013.01); *B32B 27/306* (2013.01); *B32B 37/02* (2013.01); *B32B 37/26* (2013.01); *B32B 38/164* (2013.01); *B32B 2038/168* (2013.01); *B32B 2307/728* (2013.01); *B32B 2307/73* (2013.01); *B32B 2535/00* (2013.01)

(56) References Cited

U.S. PATENT DOCUMENTS

| | | |
|---|---|---|
| 8,765,263 B2 | 7/2014 | Ho et al. |
| 9,011,754 B2 | 4/2015 | Leong et al. |
| 9,115,289 B2 | 8/2015 | Lee et al. |
| 9,132,194 B2 | 9/2015 | McKay |
| 9,272,073 B2 | 3/2016 | Ladet et al. |
| 2008/0160327 A1 | 7/2008 | Knoerzer et al. |
| 2009/0047517 A1 | 2/2009 | Caruso et al. |
| 2010/0221560 A1 | 9/2010 | Knoerzer et al. |
| 2014/0336557 A1 | 11/2014 | Durdag et al. |
| 2016/0122865 A1 | 5/2016 | Sequeda Osorio et al. |
| 2017/0239172 A1 | 8/2017 | Obeid et al. |
| 2018/0169295 A1* | 6/2018 | Yang .................... A61L 24/043 |
| 2018/0193537 A1 | 7/2018 | Honglei et al. |
| 2018/0200403 A1* | 7/2018 | Chang ................. A61L 24/0094 |

FOREIGN PATENT DOCUMENTS

| | | |
|---|---|---|
| CN | 101703811 A | 5/2010 |
| CN | 102525655 A | 7/2012 |
| CN | 102526812 A | 7/2012 |
| CN | 103394131 A | 11/2013 |
| CN | 103941554 A | 7/2014 |
| CN | 103948957 A | 7/2014 |
| CN | 105194739 A | 12/2015 |
| CN | 105688261 A | 6/2016 |
| CN | 106730018 A | 5/2017 |
| CN | 108210986 A | 6/2018 |
| EP | 1634609 A2 | 3/2006 |
| JP | 2015-147098 A | 8/2015 |
| TW | 201636420 A | 10/2016 |
| TW | 201823354 A | 7/2018 |
| WO | WO 01/01963 A1 | 1/2001 |
| WO | WO 02/085423 A1 | 10/2002 |
| WO | WO 2009/132029 A2 | 10/2009 |

OTHER PUBLICATIONS

An et al., "The Study and Practice of Surface Modification Technology for Nitramine Explosives," Beijing Institute of Technology Press, Dec. 2016, p. 8, with an English abstract.
Chen et al., "Studies on the Preparation and Characterization of mPEG-polyester Biodegradable Bioglue for Bone Defect Repair," Journal of Medical and Biological Engineering, vol. 31, No. 1, Jan. 2011, pp. 13-17.
Chinese Office Action and Search Report for Chinese Application No. 201911104798.3, dated Jul. 20, 2021.
Choi et al., "Human gelatin tissue-adhesive hydrogels prepared by enzyme-mediated biosynthesis of DOPA and $Fe^{3+}$ ion crosslinking," J. Mater. Chem. B. (2014), vol. 2, pp. 201-209.
Lai et al., "Properties of Hydrophilicity/Hydrophobicity and Biodegradation of Polycaprolactone/Polyvinylpyrrolidone Blends," Synthetic Fiber in China, vol. 40, No. 10, 2011, pp. 22-26, with an English abstract.
Notice of Allowance dated Jan. 29, 2022, in Chinese Patent Application No. 201911104798.3.
Taiwanese Office Action and Search Report, dated May 28, 2020, for Taiwanese Application No. 108140271.
Wang et al., "Solvent bonding construction of plastic pipes," China Water & Wastewater, vol. 18, No. 2, 2002, pp. 88-90, with an English abstract.
Wu et al., "Nanofibrous asymmetric membranes self-organized from chemically hetergeneous electrospun mats for skin tissue engineering," Biomedical Materials, Jun. 21, 2016, pp. 1-12.
Zhang et al., "Origin of delamination/adhesion in co2 casting and the open structure," Membrane Science and Technology, vol. 31, No. 1, Feb. 2011, pp. 25-34, with an English abstract.

* cited by examiner

| Material\Concentration(wt%) | PLGA | PLA(PDL20) |
|---|---|---|
| 10% | Particles and delamination occurred | |
| 15% | | |
| 20% | | Too thick to form a film |

FIG. 7

BIFUNCTIONAL FILM

CROSS REFERENCE TO RELATED APPLICATION

This application is a Divisional of pending U.S. patent application Ser. No. 16/675,838, filed on Nov. 6, 2019 and entitled "BIFUNCTIONAL FILM AND METHOD FOR PREPARING THE SAME", which claims the benefit of U.S. Provisional Application No. 62/756,777, filed on Nov. 7, 2018, the entirety of which is incorporated by reference herein.

TECHNICAL FIELD

The present disclosure is related to a film, and is particularly related to a bifunctional film and a method for preparing the same.

BACKGROUND

At present, patchwork materials such as implantable meshes or patches used in surgical operations still need to be sutured with surgical sutures or stitches to repair the wound. The film materials that are most commonly used are patching films such as Surgiwrap and Neoveil.

Some patches do not require sutures, mainly TissuePatch. However, this patch is mostly used for patching lungs or diffuse bleeding wounds, and not applicable everywhere on the body.

Furthermore, at present, there are two major problems with wound patching. One is leakage, and the other is adhesion of wound to tissues or organs. Currently, most commercially available films only have a single function, which are mainly used for patching without an anti-adhesion effect. Although patches such as Seprafilm and other hyaluronic acid-series products are mainly used to reduce the possibility of adhesion after surgery, the main clinical problems of such products are that they degrade too quickly and can easily break or dissolve, causing them to be washed away by body fluids and resulting in reduced effectiveness. In addition, the aforementioned commercial products are mainly used for solving a single clinical problem, and cannot solve clinically multiple problems at once.

Therefore, at present, a novel patching film which can achieve a perfect fit and seal without the need for an additional fixative and has excellent anti-adhesion effect is needed.

SUMMARY

The present disclosure provides a method for preparing a bifunctional film, comprising (a) drying a first polymer solution to form a film to form an anti-adhesion layer and (b) drying a second polymer solution over the anti-adhesion layer to form a film to form an attachment layer. The first polymer solution comprises a first hydrophobic solution and a first hydrophilic solution, wherein a solute of the first hydrophobic solution is at least one hydrophobic polymer selected from a group consisting of: polycaprolactone (PCL), polylactic acid (PLA), poly(lactic-co-glycolic acid) (PLGA), poly(glycolic acid) (PGA), polyhydroxybutyrate (PHB), polydioxanone (PDS), poly(propylene fumarate) (PPF), polyanhydrides, polyacetals, poly(ortho esters), polycarbonates, polyurethanes, polyphosphazenes and polyphosphoester, and a solute of the first hydrophilic solution is at least one hydrophilic polymer selected from a group consisting of: hyaluronic acid (HA), polyvinyl alcohol (PVA), carboxymethyl cellulose (CMC), polyethylene glycol (PEG), a derivative of polyethylene glycol and poly(ethylene oxide) (PEO), and wherein in first polymer solution, the weight ratio of the solute of the first hydrophobic solution to the solute of the first hydrophilic solution is 1:0.01-1. The second polymer solution consists of a second hydrophilic solution, wherein a solute of the second hydrophilic solution is at least one hydrophilic polymer selected from a group consisting of: gelatin, a modified gelatin, alginate, polyvinyl alcohol (PVA), carboxymethyl cellulose (CMC), polyethylene glycol (PEG), a derivative of polyethylene glycol, collagen, demineralized bone matrix (DBM), bone morphogenetic protein (BMP), albumin, chitosan, fibrin, polyoxyethylene and polyvinylpyrrolidone.

The present disclosure also provides a bifunctional film prepared by the method for preparing a bifunctional film mentioned above.

The present disclosure further provides a bifunctional film, comprising: an anti-adhesion layer and an attachment layer over the anti-adhesion layer. The anti-adhesion layer is composed of a first polymer mixture, and the first polymer mixture comprises: a first hydrophobic polymer which is at least one hydrophobic polymer selected from a group consisting of: polycaprolactone (PCL), polylactic acid (PLA), poly(lactic-co-glycolic acid) (PLGA), poly(glycolic acid) (PGA), polyhydroxybutyrate (PHB), polydioxanone (PDS), poly(propylene fumarate) (PPF), polyanhydrides, polyacetals, poly(ortho esters), polycarbonates, polyurethanes, polyphosphazenes and polyphosphoester, and a first hydrophilic polymer which is at least one hydrophilic polymer selected from a group consisting of: hyaluronic acid (HA), polyvinyl alcohol (PVA), carboxymethyl cellulose (CMC), polyethylene glycol (PEG), a derivative of polyethylene glycol and poly(ethylene oxide) (PEO), and in the anti-adhesion layer, the weight ratio of the first hydrophobic polymer to the first hydrophilic polymer is 1:0.01-1. Moreover, the attachment layer is composed of a second hydrophilic polymer, and the second hydrophilic polymer is at least one hydrophilic polymer selected from a group consisting of: gelatin, a modified gelatin, alginate, polyvinyl alcohol (PVA), carboxymethyl cellulose (CMC), polyethylene glycol (PEG), a derivative of polyethylene glycol, collagen, demineralized bone matrix (DBM), bone morphogenetic protein (BMP), albumin, chitosan, fibrin, polyoxyethylene and polyvinylpyrrolidone.

A detailed description is given in the following embodiments with reference to the accompanying drawings.

BRIEF DESCRIPTION OF DRAWINGS

The present invention can be more fully understood by reading the subsequent detailed description and examples with references made to the accompanying drawings, wherein:

FIG. 7 shows the observation results of film formations in the process of Examples 3-1 to 3-3 and Examples 4-1 to 4-3;

DETAILED DESCRIPTION

Figure 1:
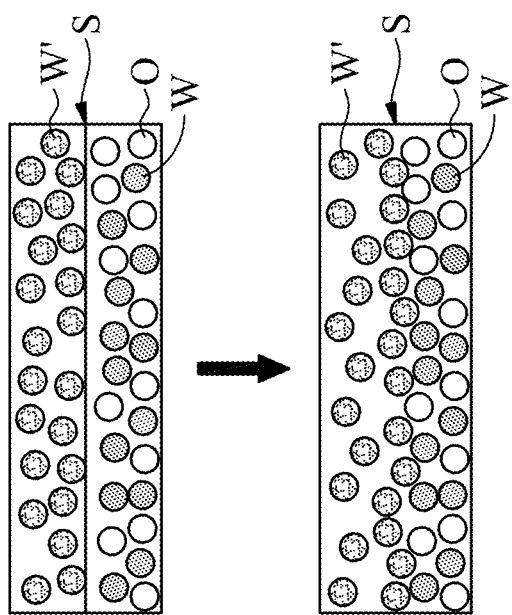
FIG. 1 is a schematic diagram of the formation principle for the multilayer structure of the bifunctional film of the present disclosure.
Figure 1:
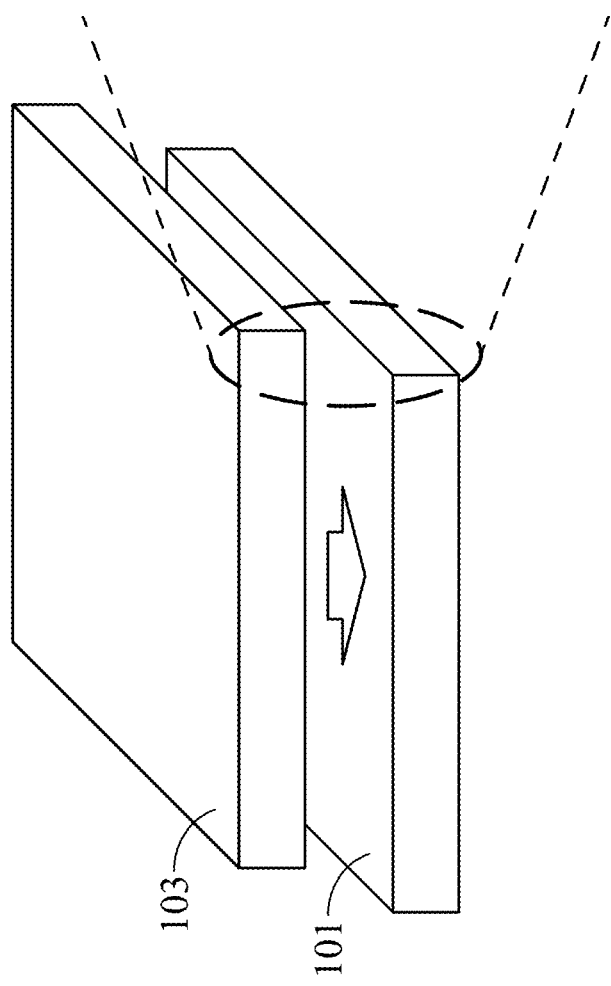

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

This disclosure provides a bifunctional film, one surface of which can adhere well to tissues and/or wounds while the other surface of which has an anti-adhesion effect and can prevent the occurrence of unwanted tissue adhesion.

The bifunctional film of the present disclosure is a biodegradable non-fiber form film, and can be well attached on a surgical wound or a diffuse wound without needing sutures or another fixing manner, and can prevent leakage of tissue fluid. Furthermore, in one embodiment of the present disclosure, an adherent type bifunctional film which is sutureless is provided, and this bifunctional film has the effect of preventing leakage and the anti-adhesion effect.

The bifunctional film of the present disclosure may have a multi-layer structure, and the layers can be tightly bonded to each other without using an additional adhesive, and the principle thereof can be explained as follows, but it is not limited thereto.

In the present disclosure, bonding between the multiple layers of the bifunctional film can be achieved by a specific order of forming respective layer, but it is not limited thereto. Refer to FIG. 1. FIG. 1 is a schematic diagram of the formation principle for the multilayer structure of the bifunctional film of the present disclosure.

First, bottom layer 101 is formed by a mixture solution having a hydrophobic component O and a hydrophilic component W at the same time, wherein the mixture solution has a hydropobic solvent and a hydrophilic solvent at the same time.

After the bottom layer 101 is dried, upper layer 103 is formed on the bottom layer 101 with a solution having a hydrophilic component W', and after the upper layer is dried, film 100 with a multi-layer structure is formed. The solvent of the solution having the hydrophilic component W' is a hydrophilic solvent, and the hydrophilic component W and the hydrophilic component W' may be the same or different.

While the upper layer 103 is drying, the hydrophilic solvent in the upper layer 103 will dissolve the hydrophilic component in the surface area of the bottom layer 101 underneath the upper layer 103 and this will cause the surface of the bottom layer 101 in contact with the upper layer 103 to partially dissolve. Therefore, the hydrophilic component W' in the upper layer 103 can enter the surface of the bottom layer and this fuse the contact surfaces of the bottom layer 101 and the upper layer 103 together. The interface S between the two layers may disappear or become inconspicuous, so that the two layers are tightly bonded.

Conversely, if the bottom layer 101 is first formed with a solution having a hydrophilic component W', and after the bottom layer 101 is dried, the upper layer 103 is formed on the bottom layer 101 with a mixture solution having a hydrophobic component O and a hydrophilic component W at the same time, since the upper layer 103 has both a hydrophobic solvent and a hydrophilic solvent, the content of the hydrophilic solvent in the upper layer 103 is lower than that in the case where the upper layer 103 is formed of a solution having a hydrophilic component W', and that results in the hydrophilic solvent in the upper layer 103 being less easy to dissolve the hydrophilic component W' of the surface region of the bottom layer 101 underneath the upper layer 103, and makes it harder to bond the two layers to each other.

In one embodiment, the bifunctional film of the present disclosure may be prepared by the method for preparing a bifunctional film described in the following, but it is not limited thereto.

The method for preparing a bifunctional film mentioned above may comprise, but is not limited to, the following steps.

Figure 2A:
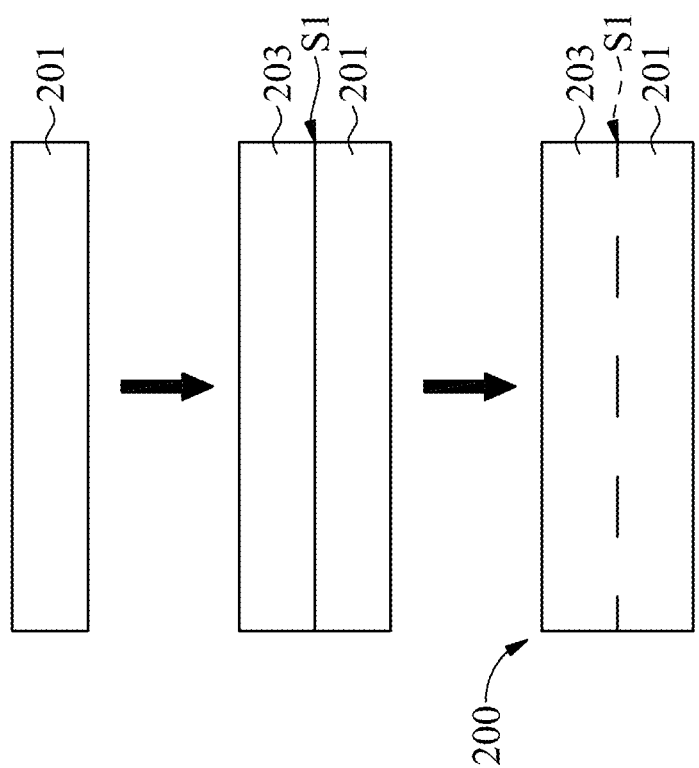
FIG. 2A shows one embodiment of the formation of the bifunctional film of the present disclosure.

Refer to FIG. 2A. FIG. 2A shows one embodiment of the formation of the bifunctional film of the present disclosure.

First, a first polymer solution is dried to form a film to form an anti-adhesion layer 201. The first polymer solution may comprise a first hydrophobic solution and a first hydrophilic solution, but it is not limited thereto.

Moreover, in the first polymer solution mentioned above, the weight ratio of the solute of the first hydrophobic solution to the solute of the first hydrophilic solution may be about 1:0.01-1, e.g., about 1:0.02, about 1:0.025, about 1:0.03, about 1:0.05, about 1:0.1, about 1:0.2, about 1:0.3, about 1:0.4, about 1:0.5, or about 1:1, but it is not limited thereto.

Example of the solute of the first hydrophobic solution mentioned above may comprise polycaprolactone (PCL), poly(lactic-co-glycolic acid) (PLGA), polylactic acid (PLA), poly(glycolic acid) (PGA), polyhydroxybutyrate (PHB), polydioxanone (PDS), poly(propylene fumarate) (PPF), polyanhydrides, polyacetals, poly(ortho esters), polycarbonates, polyurethanes, polyphosphazenes, polyphosphoester or any combination thereof, but it is not limited thereto.

In one embodiment, the solute of the first hydrophobic solution mentioned above may be polycaprolactone, poly(lactic-co-glycolic acid) or polylactic acid. In this embodiment, the weight ratio of the solute of the first hydrophobic solution to the solute of the first hydrophilic solution may be 1:0.01-1, e.g., about 1:0.02, about 1:0.025, about 1:0.03, about 1:0.05, about 1:0.1, about 1:0.2, about 1:0.3, about 1:0.4, about 1:0.5, or about 1:1, but it is not limited thereto.

In one specific embodiment, the solute of the first hydrophobic solution mentioned above may be polycaprolactone. In this embodiment, the weight ratio of the polycaprolactone to the solute of the first hydrophilic solution may be 1:0.01-1, e.g., about 1:0.02, about 1:0.025, about 1:0.03, about 1:0.05, about 1:0.1, about 1:0.2, about 1:0.3, about 1:0.4, about 1:0.5, or about 1:1, but it is not limited thereto.

In another specific embodiment, the solute of the first hydrophobic solution mentioned above may be poly(lactic-co-glycolic acid). In this embodiment, the weight ratio of the poly(lactic-co-glycolic acid) to the solute of the first hydrophilic solution may be 1:0.01-1, e.g., about 1:0.02, about 1:0.025, about 1:0.03, about 1:0.05, about 1:0.1, about 1:0.2, about 1:0.3, about 1:0.4, about 1:0.5, or about 1:1, but it is not limited thereto.

In another specific embodiment, the solute of the first hydrophobic solution mentioned above may be polylactic acid. In this embodiment, the weight ratio of the polylactic acid to the solute of the first hydrophilic solution may be 1:0.01-1, e.g., about 1:0.02, about 1:0.025, about 1:0.03, about 1:0.05, about 1:0.1, about 1:0.2, about 1:0.3, about 1:0.4, about 1:0.5, or about 1:1, but it is not limited thereto.

Moreover, examples of the solvent of the first hydrophobic solution mentioned above may include, but are not limited to, acetone, acetic acid, chloroform, methanol, dichloromethane, dimethylformamide, dioxane, ethyl acetate, formic acid, hexafluoroisopropanol, 1-methyl-2-pyrrolidone chloride, tetrahydrofuran, toluene, and mixture solutions thereof.

The solute of the first hydrophilic solution may comprise, but is not limited to, hyaluronic acid (HA), polyvinyl alcohol (PVA), carboxymethyl cellulose (CMC), polyethylene glycol (PEG), a derivative of polyethylene glycol, poly(ethylene oxide) (PEO) or a combination thereof. Examples of the foregoing derivative of polyethylene glycol may include, but are not limited to, methacrylic anhydride-modified polyethylene glycol. Furthermore, the molecular weight of the methacrylic anhydride-modified polyethylene glycol mentioned above may be about 1000-40000, e.g., about 1500, about 8000, or about 35000, but it is not limited thereto.

In one embodiment, the solute of the first hydrophilic solution mentioned above may be hyaluronic acid or a combination of hyaluronic acid and polyvinyl alcohol. In this embodiment, the weight ratio of the solute of the first hydrophobic solution to the hyaluronic acid or the combination of hyaluronic acid and polyvinyl alcohol may be about 1:0.01-1, e.g., about 1:0.025, about 1:0.05, about 1:0.075, or about 1:0.1, but it is not limited thereto.

In one specific embodiment, the solute of the first hydrophilic solution mentioned above may be hyaluronic acid. In this embodiment, the weight ratio of the solute of the first hydrophobic solution to the hyaluronic acid may be about 1:0.01-1, e.g., about 1:0.025, about 1:0.05, or about 1:0.1, but it is not limited thereto.

In another specific embodiment, the solute of the first hydrophilic solution mentioned above may be a combination of hyaluronic acid and polyvinyl alcohol. In this embodiment, the weight ratio of the hyaluronic acid and the polyvinyl alcohol may be about 1:0.5-5, e.g., about 1:0.5, about 1:1, about 1:1.5, about 1:2, about 1:3, about 1.4, or about 1:5, but it is not limited thereto. Moreover, in this embodiment, the weight ratio of the solute of the first hydrophobic solution, the hyaluronic acid and polyvinyl alcohol may be about 1:0.01-1:0.01-1, e.g., about 1:0.0125:0.0125, about 1:0.0125:0.025, about 1:0.025:0.025, or about 1:0.025:0.05, but it is not limited thereto.

Furthermore, in the first hydrophilic solution mentioned above, the content of the solute of the first hydrophilic solution may be about 0.1-10% (w/v), e.g., 0.1% (w/v), 0.25% (w/v), 0.5% (w/v), 1% (w/v), 1.5% (w/v), 2% (w/v), 5% (w/v), 8% (w/v), or 10% (w/v), but it is not limited thereto.

In addition, a solvent of the first hydrophilic solution mentioned above may be a hydrophilic solvent, such as water, an acidic aqueous solution, but it is not limited thereto. Example of the acidic aqueous solution may comprise, but is not limited to, a hydrochloric acid aqueous solution, an acetic acid aqueous solution, etc.

Moreover, a method for forming the first polymer solution may comprise mixing the first hydrophobic solution mentioned above with the first hydrophilic solution mentioned above, wherein in the first polymer solution, the solute of the first hydrophilic solution can be used as a dispersing agent, and the content of the solute of the first hydrophilic solution mentioned above in the first polymer solution is sufficient to let the first polymer solution become a homogeneous mixture in colloidal form.

A manner for drying the first polymer solution to form a film to form an anti-adhesion layer 201 has no particular limitation, only that the first polymer solution is able to form a film. In one embodiment, the first polymer solution may be poured onto a plate, and then scraped with a scraper to perform a film scraping procedure, and after that, dried to form a film.

In addition, thickness of the anti-adhesion layer 201 depends on needs, and has no particular limitation. In one embodiment, the thickness of the anti-adhesion layer 201 may be about 10-200 μm, e.g., about 15 μm, about 20 μm, about 30 μm, about 50 μm, about 75 μm, about 100 μm, about 125 μm, about 150 μm, or about 200 μm, but it is not limited thereto. In one specific embodiment, the thickness of the anti-adhesion layer 201 may be about 15 μm, and in another specific embodiment, the thickness of the anti-adhesion layer 201 may be about 30 μm.

Next, after drying the first polymer solution to form a film to form an anti-adhesion layer 201, a second polymer solution is dried over the anti-adhesion layer 201 mentioned above to form a film to form an attachment layer 203 to form a bifunctional film 200 with a double layer structure.

Moreover, the second polymer solution may comprise, but is not limited to, a second hydrophilic solution.

The moisture content of the second hydrophilic solution may be about 30000-100000 ppm, e.g., about 50000-70000 ppm, about 50000 ppm, about 63000 ppm, or about 70000 ppm, but it is not limited thereto. Moreover, the viscosity of the second hydrophilic solution may be 20-2000 cP, e.g., about 30-200 cP, about 30 cP, about 100 cP, about 200 cP, about 300-700 cP, about 300 cP, about 350 cP, about 400 cP, about 450 cP, about 550 cP, about 580 cP, about 600 cP, about 650 cP, about 700 cP, about 800-2000 cP, about 900 cP, about 1000 cP, about 1500 cP, or about 2000 cP, but it is not limited thereto.

Furthermore, in the second hydrophilic solution, the content of the solute of the second hydrophilic solution may be about 0.05-60% (w/v), e.g., about 0.05-2% (w/v), about 0.1-10% (w/v), about 25-60% (w/v), about 0.05% (w/v), about 0.1% (w/v), about 0.2% (w/v), about 0.25% (w/v), about 0.5% (w/v), about 0.75% (w/v), about 1% (w/v), about 1.5%, about 2% (w/v), about 3% (w/v), about 4% (w/v), about 5% (w/v), about 8% (w/v), about 10% (w/v), about 25% (w/v), about 30% (w/v), about 37% (w/v), about 40% (w/v), about 45% (w/v), about 50% (w/v), about 55% (w/v), or about 60% (w/v), but it is not limited thereto.

Example of a solute of the second hydrophilic solution may comprise at least one hydrophilic polymer described in the following, but is not limited thereto: gelatin, a modified gelatin, alginate, polyvinyl alcohol (PVA), carboxymethyl cellulose (CMC), polyethylene glycol (PEG), a derivative of polyethylene glycol, collagen, demineralized bone matrix (DBM), bone morphogenetic protein (BMP), albumin, chitosan, fibrin, polyoxyethylene, polyvinylpyrrolidone or any combination thereof. Example of the foregoing derivative of polyethylene glycol may comprise, but is not limited to, methacrylic anhydride-modified polyethylene glycol. Furthermore, the molecular weight of the methacrylic anhydride-modified polyethylene glycol mentioned above may be about 1000-40000, e.g., about 1500, about 8000, or about 35000, but it is not limited thereto.

A solvent of the second hydrophilic solution mentioned above may be a hydrophilic solvent, such as water, an acidic aqueous solution, but it is not limited thereto. Example of the acidic aqueous solution may comprise, but is not limited to, a hydrochloric acid aqueous solution, an acetic acid aqueous solution, etc.

In one embodiment, the solute of the second hydrophilic solution is gelatin. In this embodiment, a molecular weight of the gelatin may be about 250 Bloom, but it is not limited thereto. In this embodiment, the moisture content of the second hydrophilic solution may be about 30000-100000 ppm, e.g., about 50000-70000 ppm, about 50000 ppm, about 63000 ppm, or about 70000 ppm, but it is not limited thereto. Moreover, in this embodiment, viscosity of the second hydrophilic solution may be 20-1000 cP, e.g., about 250 cP, about 500 cP, about 700 cP, or about 950 cP, but it is not limited thereto. Furthermore, in this embodiment, in the second hydrophilic solution, the content of the solute of the second hydrophilic solution may be about 25-60% (w/v), e.g., about 25% (w/v), about 30% (w/v), about 37% (w/v), about 40% (w/v), about 45% (w/v), about 50% (w/v), about 55% (w/v), or about 60% (w/v), but it is not limited thereto. In addition, in this embodiment, the solvent of the second hydrophilic solution may be water.

In another embodiment, the solute of the second hydrophilic solution is a modified gelatin. Examples of the modified gelatin may include, but are not limited to, a gelatin modified with dihydroxyphenyl-alanine (DOPA) (gelatin-DOPA) and a gelatin modified with glutaraldehyde (GA) (gelatin-GA). In this embodiment, the molecular weight of the modified gelatin may be about 250 Bloom, but it is not limited thereto. In this embodiment, the moisture content of the second hydrophilic solution may be about 30000-100000 ppm, e.g., about 50000-70000 ppm, about 50000 ppm, about 63000 ppm, or about 70000 ppm, but it is not limited thereto. Moreover, in this embodiment, the viscosity of the second hydrophilic solution may be 100-2000 cP, e.g., about 100, about 150, about 300, about 500 cP, about 700, about 1000 cP, about 1500, or about 2000, but it is not limited thereto. Furthermore, in this embodiment, in the second hydrophilic solution, the content of the solute of the second hydrophilic solution may be about 25-60% (w/v), e.g., about 25% (w/v), about 30% (w/v), about 37% (w/v), about 40% (w/v), about 45% (w/v), about 50% (w/v), about 55% (w/v), or about 60% (w/v), but it is not limited thereto. In addition, in this embodiment, the solvent of the second hydrophilic solution may be water.

Moreover, in another embodiment, the solute of the second hydrophilic solution is carboxymethyl cellulose. In this embodiment, the moisture content of the second hydrophilic solution may be about 30000-100000 ppm, e.g., about 50000-70000 ppm, about 50000 ppm, about 63000 ppm, or about 70000 ppm, but it is not limited thereto. Furthermore, in this embodiment, the viscosity of the second hydrophilic solution may be 20-1000 cP, e.g., about 30 cP, about 100 cP, or about 250 cP, but it is not limited thereto. Furthermore, in this embodiment, in the second hydrophilic solution, the content of the solute of the second hydrophilic solution may be about 0.1-10% (w/v), e.g., about 0.1% (w/v), about 0.5% (w/v), about 1% (w/v), about 2% (w/v), about 3% (w/v), about 4% (w/v), about 5% (w/v), about 8% (w/v), or about 10% (w/v), but it is not limited thereto. In addition, in this embodiment, the solvent of the second hydrophilic solution may be water.

In another embodiment, the solute of the second hydrophilic solution is collagen. In this embodiment, the moisture content of the second hydrophilic solution may be about 30000-100000 ppm, e.g., about 50000-70000 ppm, about 50000 ppm, about 63000 ppm, or about 70000 ppm, but it is not limited thereto. Moreover, in this embodiment, the viscosity of the second hydrophilic solution may be 100-2000 cP, e.g., about 250 cP or about 1000 cP, but it is not limited thereto. Furthermore, in this embodiment, in the second hydrophilic solution, the content of the solute of the second hydrophilic solution may be about 0.05-2% (w/v), e.g., about 0.05% (w/v), about 0.1% (w/v), about 0.2% (w/v), about 0.25% (w/v), about 0.5% (w/v), about 0.75% (w/v), about 1% (w/v), about 1.5% (w/v), or about 2% (w/v), but it is not limited thereto. In addition, in this embodiment, the solvent of the second hydrophilic solution may be a hydrochloric acid aqueous solution.

The solvent of the second hydrophilic solution and the solvent of the first hydrophilic solution may be the same or different, as long as the solvent of the second hydrophilic solution can also dissolve the solute of the first hydrophilic solution.

As the principle mentioned above, while the second polymer solution on the anti-adhesion layer 201 is being dried to form the attachment layer 203, second hydrophilic solvent in the attachment layer 203 will dissolve the first hydrophilic polymer in the surface area of the anti-adhesion layer 201 underneath the attachment layer 203 and this will cause the surface of the anti-adhesion layer 201 in contact with the attachment layer 203 to partially dissolve. Therefore, the second hydrophilic polymer in the attachment layer 203 can enter the surface of the anti-adhesion layer 201 and this fuse the contact surfaces of the anti-adhesion layer 201 and the attachment layer 203 together. The interface S1 between the two layers may disappear or become inconspicuous, so that the two layers are tightly bonded.

A manner for drying the second polymer solution to form a film to form an attachment layer 203 has no particular limitation, only that the second polymer solution is able to form a film. In one embodiment, the first polymer solution may be poured onto the anti-adhesion layer 201, and then scraped with a scraper to perform a film scraping procedure, and after that, dried to form a film.

In addition, thickness of the attachment layer 203 depends on needs, and has no particular limitation. In one embodiment, the thickness of the attachment layer 203 may be about 10-200 μm, e.g., about 15 μm, about 20 μm, about 30 μm, about 50 μm, about 75 μm, about 100 μm, about 125 μm, about 150 μm, or about 200 μm, but it is not limited thereto. In one specific embodiment, the thickness of the attachment layer 203 may be about 15 μm, and in another specific embodiment, the thickness of the attachment layer 203 may be about 30 μm.

Figure 2B:
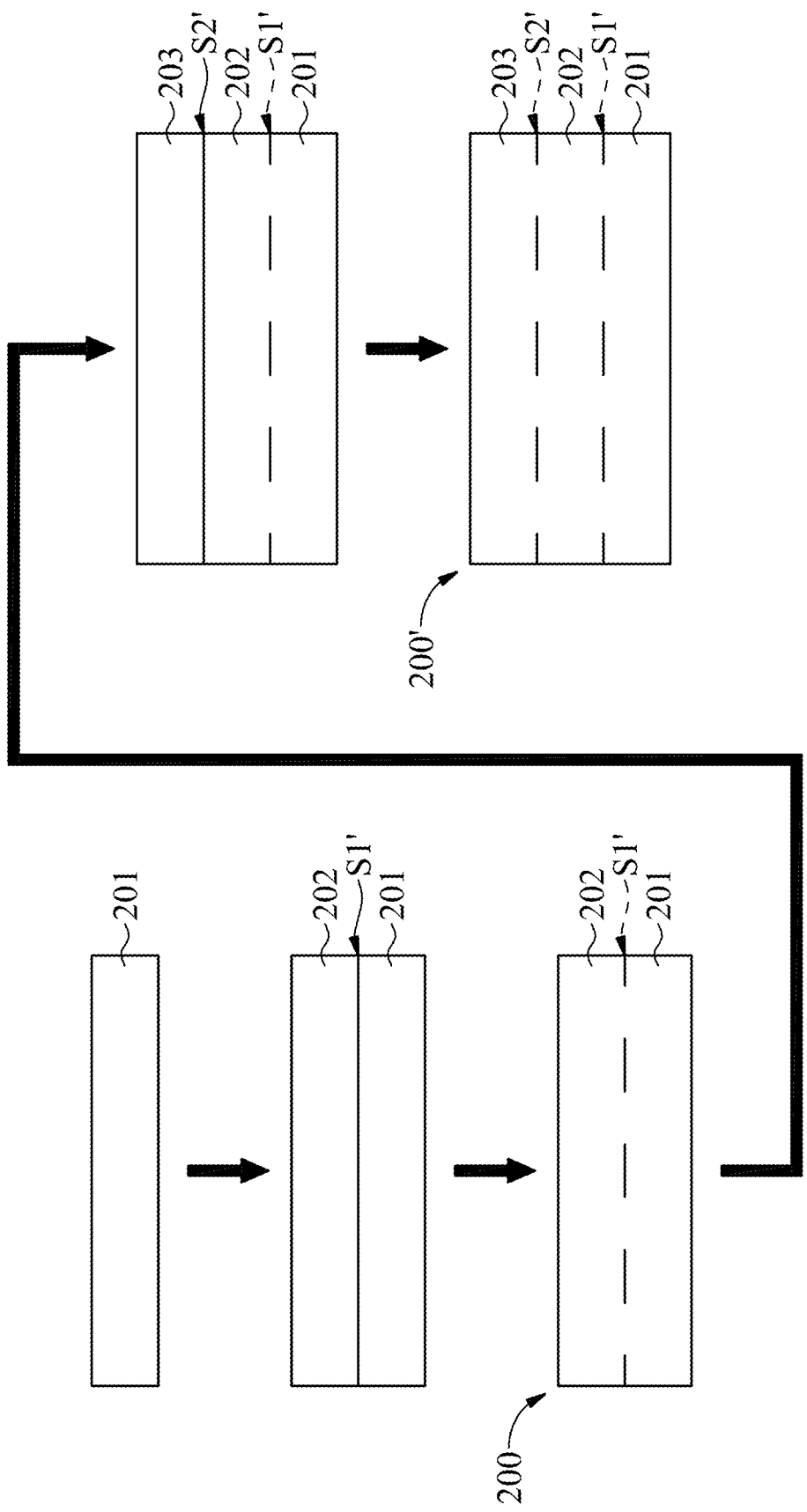
FIG. 2B shows another embodiment of the formation of the bifunctional film of the present disclosure.

FIG. 2B shows another embodiment of the formation of the bifunctional film of the present disclosure. In this embodiment, the method for preparing a bifunctional film mentioned above, in addition to the step of drying a first polymer solution to form a film to form an anti-adhesion layer 201 and the step of after drying the first polymer solution to form a film to form an anti-adhesion layer 201, drying a second polymer solution is over the anti-adhesion layer 201 to form a film to form an attachment layer 203 mentioned above, may further comprise drying a third polymer solution over the anti-adhesion layer 201 to form a film to form an intermediate layer 202 between the anti-adhesion layer 201 and the attachment layer 203.

All the descriptions regarding to the anti-adhesion layer 201 and the attachment layer 203 and the formation thereof are the same as those described above, and thus they are not repeated here.

Refer to FIG. 2B. After forming the anti-adhesion layer 201, drying a third polymer solution over the anti-adhesion layer 201 to form a film to form an intermediate layer 202. The third polymer solution may comprise a second hydrophobic solution and a third hydrophilic solution, but it is not limited thereto.

In the third polymer solution mentioned above, the weight ratio of the solute of the second hydrophobic solution to the solute of the third hydrophilic solution may be about 1:0.005-5, e.g., about 1:0.0125, about 1:0.15, about 1:0.5, about 1:0.925, about 1:1, or about 1:1.85, but it is not limited thereto.

Example of the solute of the second hydrophobic solution mentioned above may comprise polycaprolactone, polylactic acid, poly(lactic-co-glycolic acid), poly(glycolic acid), polyhydroxybutyrate, polydioxanone, poly(propylene fumarate), polyanhydrides, polyacetals, poly(ortho esters), polycarbonates, polyurethanes, polyphosphazenes, polyphosphoester or any combination thereof, but it is not limited thereto.

In one embodiment, the solute of the second hydrophobic solution mentioned above may be polycaprolactone, poly(lactic-co-glycolic acid) or polylactic acid. In this embodiment, the weight ratio of the solute of the second hydrophobic solution to the solute of the third hydrophilic solution may be 1:0.005-5, e.g., about 1:0.0125, about 1:0925, or about 1:1.85, but it is not limited thereto.

In one specific embodiment, the solute of the second hydrophobic solution mentioned above may be polycaprolactone. In this embodiment, the weight ratio of the polycaprolactone to the solute of the third hydrophilic solution may be about 1:0.005-5, e.g., about 1:0.0125, about 1:0925, about 1:1.25, or about 1:1.85, but it is not limited thereto.

In another specific embodiment, the solute of the second hydrophobic solution mentioned above may be poly(lactic-co-glycolic acid). In this embodiment, the weight ratio of the poly(lactic-co-glycolic acid) to the solute of the third hydrophilic solution may be about 1:0.005-5, e.g., about 1:0.925, about 1:1.25, or about 1:1.85, but it is not limited thereto.

In another specific embodiment, the solute of the second hydrophobic solution mentioned above may be polylactic acid. In this embodiment, the weight ratio of the polylactic acid to the solute of the third hydrophilic solution may be about 1:0.005-5, e.g., about 1:0.5, about 1:1, or about 1:1.25, but it is not limited thereto.

The moisture content of the third hydrophilic solution may be about 30000-100000 ppm, e.g., about 50000-70000 ppm, about 50000 ppm, about 63000 ppm, or about 70000 ppm, but it is not limited thereto. Moreover, the viscosity of the second hydrophilic solution may be 20-2000 cP, e.g., about 30-200 cP, about 30 cP, about 100 cP, about 200 cP, about 300-700 cP, about 300 cP, about 350 cP, about 400 cP, about 450 cP, about 550 cP, about 580 cP, about 600 cP, about 650 cP, or about 700 cP, but it is not limited thereto.

In addition, in the third hydrophilic solution, the content of the solute of the third hydrophilic solution may be about 0.05-60% (w/v), e.g., about 0.05-2% (w/v), about 0.1-10% (w/v), about 25-60% (w/v), about 0.05% (w/v), about 0.1% (w/v), about 0.2% (w/v), about 0.25% (w/v), about 0.5% (w/v), about 0.75% (w/v), about 1% (w/v), about 1.5% (w/v), about 2% (w/v), about 3% (w/v), about 4% (w/v), about 5% (w/v), about 8% (w/v), about 10% (w/v), about 25% (w/v), about 30% (w/v), about 37% (w/v), about 40% (w/v), about 45% (w/v), about 50% (w/v), about 55% (w/v), or about 60% (w/v), but it is not limited thereto.

Example of a solute of the third hydrophilic solution may comprise at least one hydrophilic polymer described in the following, but is not limited thereto: gelatin, a modified gelatin, alginate, polyvinyl alcohol (PVA), carboxymethyl cellulose (CMC), polyethylene glycol (PEG), a derivative of polyethylene glycol, collagen, demineralized bone matrix (DBM), bone morphogenetic protein (BMP), albumin, chitosan, fibrin, polyoxyethylene, polyvinylpyrrolidone or any combination thereof. Examples of the foregoing derivative of polyethylene glycol may include, but are not limited to, methacrylic anhydride-modified polyethylene glycol. Furthermore, the molecular weight of the methacrylic anhydride-modified polyethylene glycol mentioned above may be about 1000-40000, e.g., about 1500, about 8000, or about 35000, but it is not limited thereto.

A solvent of the third hydrophilic solution mentioned above may be a hydrophilic solvent, such as water, an acidic aqueous solution, but it is not limited thereto. Examples of the acidic aqueous solution may include, but are not limited to, hydrochloric acid aqueous solution and acetic acid aqueous solution.

In one embodiment, the solute of the third hydrophilic solution is gelatin. In this embodiment, a molecular weight of the gelatin may be about 250 Bloom, but it is not limited thereto. In this embodiment, the moisture content of the second hydrophilic solution may be about 30000-100000 ppm, e.g., about 50000-70000 ppm, about 50000 ppm, about 63000 ppm, or about 70000 ppm, but it is not limited thereto. Moreover, in this embodiment, viscosity of the second hydrophilic solution may be 20-1000 cP, e.g., about 250 cP, about 500 cP, about 700 cP, or about 950 cP, but it is not limited thereto. Furthermore, in this embodiment, in the third hydrophilic solution, the content of the solute of the second hydrophilic solution may be about 25-60% (w/v), e.g., about 25% (w/v), about 30% (w/v), about 37% (w/v), about 40% (w/v), about 45% (w/v), about 50% (w/v), about 55% (w/v), or about 60% (w/v), but it is not limited thereto.

In addition, in this embodiment, the solvent of the third hydrophilic solution may be water.

In another embodiment, the solute of the third hydrophilic solution is a modified gelatin. Examples of the modified gelatin may include, but are not limited to, gelatins modified with dihydroxyphenyl-alanine (DOPA) (gelatin-DOPA) and gelatins modified with glutaraldehyde (GA) (gelatin-GA). In this embodiment, the molecular weight of the modified gelatin may be about 250 Bloom, but it is not limited thereto. In this embodiment, the moisture content of the third hydrophilic solution may be about 30000-100000 ppm, e.g., about 50000-70000 ppm, about 50000 ppm, about 63000 ppm, or about 70000 ppm, but it is not limited thereto. Moreover, in this embodiment, the viscosity of the third hydrophilic solution may be 100-2000 cP, e.g., about 100, about 150, about 300, about 500 cP, about 700, about 1000 cP, about 1500, or about 2000, but it is not limited thereto. Furthermore, in this embodiment, in the third hydrophilic solution, the content of the solute of the third hydrophilic solution may be about 25-60% (w/v), e.g., about 25% (w/v), about 30% (w/v), about 37% (w/v), about 40% (w/v), about 45% (w/v), about 50% (w/v), about 55% (w/v), or about 60% (w/v), but it is not limited thereto. In addition, in this embodiment, the solvent of the third hydrophilic solution may be water.

In another embodiment, the solute of the third hydrophilic solution may be collagen. In this embodiment, the moisture content of the third hydrophilic solution may be about 30000-100000 ppm, e.g., about 50000-70000 ppm, about 50000 ppm, about 63000 ppm, or about 70000 ppm, but it is not limited thereto. Moreover, in this embodiment, the viscosity of the third hydrophilic solution may be 100-2000 cP, e.g., about 500 cP, or about 1000 cP, but it is not limited thereto. Furthermore, in this embodiment, in the third hydrophilic solution, the content of the solute of the third hydrophilic solution may be about 0.05-2% (w/v), e.g., about 0.05% (w/v), about 0.1% (w/v), about 0.2% (w/v), about 0.25% (w/v), about 0.5% (w/v), about 0.75% (w/v), about 1% (w/v), about 1.5% (w/v), or about 2% (w/v), but it is not limited thereto. In addition, in this embodiment, the solvent of the third hydrophilic solution may be a hydrochloric acid aqueous solution.

Moreover, a method for forming the third polymer solution may comprise mixing the second hydrophobic solution mentioned above with the third hydrophilic solution mentioned above, wherein in the second polymer solution, the solute of the third hydrophilic solution can be used as a dispersing agent, and the content of the solute of the third hydrophilic solution mentioned above in the third polymer solution is sufficient to let the third polymer solution become a homogeneous mixture in colloidal form.

A manner for drying the third polymer solution to form a film to form an intermediate layer 202 has no particular limitation, only that the third polymer solution is able to form a film. In one embodiment, the third polymer solution may be poured onto the anti-adhesion layer 201, and then scraped with a scraper to perform a film scraping procedure, and after that, dried to form a film.

In addition, thickness of the intermediate layer 202 depends on needs, and has no particular limitation. In one embodiment, the thickness of the intermediate layer 202 may be about 10-200 μm, e.g., about 15 μm, about 20 μm, about 30 μm, about 50 μm, about 75 μm, about 100 μm, about 125 μm, about 150 μm, or about 200 μm, but it is not limited thereto. In one specific embodiment, the thickness of the attachment layer 203 may be about 15 μm, and in another specific embodiment, the thickness of the attachment layer 203 may be about 30 μm.

The solvent of the third hydrophilic solution and the solvent of the first hydrophilic solution may be the same or different, as long as the solvent of the third hydrophilic solution can also dissolve the solute of the first hydrophilic solution.

As the principle mentioned above, while third polymer solution on the anti-adhesion layer 201 is being dried to form the intermediate layer 202, the third hydrophilic solvent in the intermediate layer 202 will dissolve the first hydrophilic polymer in the surface area of the anti-adhesion layer 201 underneath the intermediate layer 202 and this will cause the surface of the anti-adhesion layer 201 in contact with the intermediate layer 202 to partially dissolve. Therefore, the third hydrophilic polymer in the intermediate layer 202 can enter the surface of the anti-adhesion layer 201 and this fuse the contact surfaces of the anti-adhesion layer 201 and the intermediate layer 202 together. The interface S1' between the two layers may disappear or become inconspicuous, so that the two layers are tightly bonded.

After drying the third polymer solution over the anti-adhesion layer 201 to form a film to form an intermediate layer 202, the second polymer solution is dried over the intermediate layer 202 to form a film to form an attachment layer 203 to form a bifunctional film 200' with a triple layer structure.

The solvent of the second hydrophilic solution and the solvent of the third hydrophilic solution may be the same or different, as long as the solvent of the second hydrophilic solution can also dissolve the solute of the third hydrophilic solution.

As the principle mentioned above, the second hydrophilic solvent in the attachment layer 203 will dissolve the third hydrophilic polymer in the surface area of the intermediate layer 202 underneath the attachment layer 203 and this will cause the surface of the intermediate layer 202 in contact with the attachment layer 203 to partially dissolve. Therefore, the second hydrophilic polymer in the attachment layer 203 can enter the surface of the intermediate layer 202 and this fuse the contact surfaces of the intermediate layer 202 and the attachment layer 203 together. The interface S2' between the two layers may disappear or become inconspicuous, so that the two layers are tightly bonded.

Based on the above, the present disclosure may also provide any one of the foregoing methods for preparing a bifunctional film and films prepared from it.

Moreover, based on the above, the present disclosure also provides a bifunctional film. The bifunctional film may comprise an anti-adhesion layer and an attachment layer over the anti-adhesion layer, but it is not limited thereto.

The anti-adhesion layer mentioned above may be composed of a first polymer mixture, and the first polymer mixture may comprise, but is not limited to, a first hydrophobic polymer and a first hydrophilic polymer.

The first hydrophobic polymer and the first hydrophilic polymer described herein may respectively correspond to the solute of the first hydrophobic solution and the solute of the first hydrophilic solution mentioned above, and the relevant descriptions for these two are the same as the relevant descriptions for the solute of the first hydrophobic solution and the solute of the first hydrophilic solution, and thus they are not repeated herein.

The attachment layer mentioned above may be composed of a second hydrophilic polymer.

The second hydrophilic polymer described herein may correspond to the solute of the solute of the second hydrophilic solution mentioned above, and the relevant descriptions thereof is the same as the relevant description for the solute of the second hydrophilic solution, and thus it is not repeated herein.

In one embodiment, the bifunctional film, in addition to the anti-adhesion layer and the attachment layer, may further comprise an intermediate layer between the anti-adhesion layer and the attachment layer.

The intermediate layer mentioned above may be composed of a second polymer mixture, and the second polymer mixture may comprise, but is not limited to, a second hydrophobic polymer and a third hydrophilic polymer.

The second hydrophobic polymer and the third hydrophilic polymer described herein may respectively correspond to the solute of the second hydrophobic solution and the solute of the third hydrophilic solution mentioned above, and the relevant descriptions for these two are the same as the relevant descriptions for the solute of the second hydrophobic solution and the solute of the third hydrophilic solution, and thus they are not repeated herein.

Burst strength (ASTM F2392) of any one of the foregoing bifunctional film of the present disclosure may be about 250-600 cmH$_2$O, but it is not limited thereto.

Tensile strength (ASTM D882) of any one of the foregoing bifunctional film of the present disclosure may be about 2-36 MPa, but it is not limited thereto.

Tear resistance (ASTM D1004) of any one of the foregoing bifunctional film of the present disclosure may be about 1-10 N, but it is not limited thereto.

EXAMPLES

A. Moisture Content and Viscosity of Gelatin Solutions with Different Concentrations Different weights of gelatin were added to 10 ml of deionized water (DDW), and heated in an oven at 50° C. for 12 hours to be dissolved to complete the preparation of 30%, 37% and 50% gelatin solutions.

Figure 3:
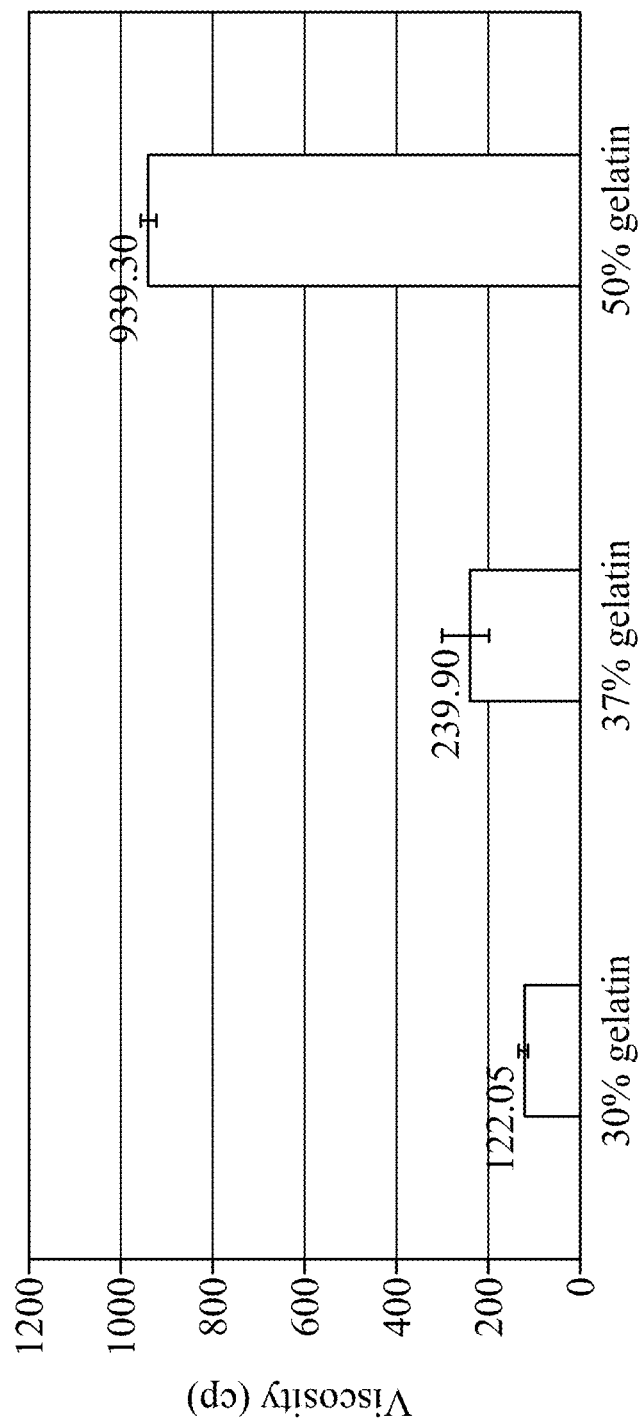
FIG. 3 shows the viscosities of the gelatin solutions with different concentrations.

Moreover, the moisture contents of the gelatin solutions with different concentrations mentioned above were determined by a moisture analyzer with nitrogen flow at 50 mL/minute. Furthermore, the viscosities of the gelatin solutions with different concentrations mentioned above were determined by a viscosity meter. The results are shown in Table 1 and FIG. 3.

TABLE 1

| Gelatin concentration (w/v) | Moisture content (ppm) |
|---|---|
| 30% | 70000 |
| 37% | 63000 |
| 50% | 50000 |

B. Double-Layer Film Containing PCL/HA/PVA Layer and Gelatin Layer

B-1. Preparation of Double-Layer Film

Comparative Example 1-1

Double-layer film containing gelatin bottom layer and PCl/HA/PVA upper layer
 1. Formation of Bottom Layer (Attachment Layer)
 (1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as a bottom layer.

2. Formation of Upper Layer (Anti-Adhesion Layer)
 4 g of polycaprolactone (PCL) was added to 20 ml of dichloromethane (DCM), and then mixed at 50 rpm for 12 hours, and preparation of a 20% polycaprolactone (PCL) solution was completed.

0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

The mixture was poured onto the foregoing Teflon plate which had an attachment layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as an upper layer, and a double layer film was obtained (the thickness of each layer before drying is about 150 μm (thickness of the scraper), and the thickness of each layer after drying to form a film is about 30 μm).

Comparative Example 1-2

Double-layer film containing PCL/gelatin layer bottom layer and PCL/HA/PVA upper layer
 1. Formation of Bottom Layer (Attachment Layer)
 (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as a bottom layer.

2. Formation of Upper Layer (Anti-Adhesion Layer)
 (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an attachment layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as an upper layer, and a double layer film was obtained (the thickness of each layer before drying is about 150 μm (thickness of the scraper), and the thickness of each layer after drying to form a film is about 30 μm).

Example 1-1

Double-layer film containing PCl/HA/PVA bottom layer and gelatin upper layer

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as an upper layer, and a double layer film was obtained (the thickness of each layer before drying is about 150 μm (thickness of the scraper), and the thickness of each layer after drying to form a film is about 30 μm).

B-2. Delamination Test for Film

Films prepared in Comparative Example 1-1 and Example 1-1 were respectively immersed in PBS buffer to observe whether the films were delaminated.

Figure 4:
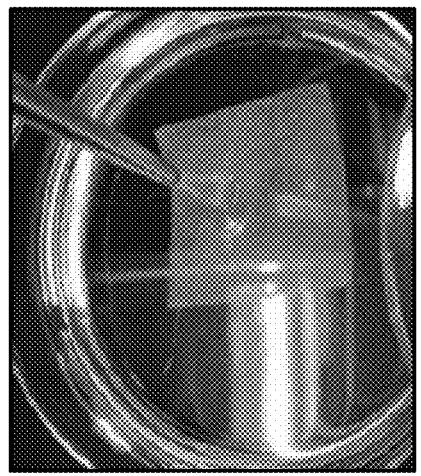
FIG. 4 shows the results of delamination test for films prepared in Comparative Example 1-1 and Example 1-1.
Figure 4:
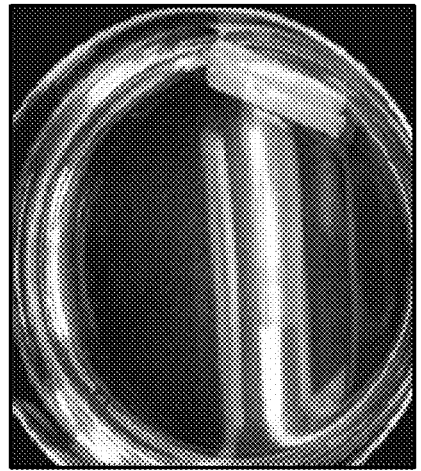

The results show that for the film prepared in the specific order of forming each layer of the present disclosure (Example 1-1), after being immersed for 30 minutes, separation does not occur between the layers of the film (referring to FIG. 4). Conversely, for the film prepared in reverse order of forming each layer (Comparative Example 1-1), within 5 minutes of immersion, delamination occurs between the layers of the film, and that results in the layers of the film becoming separated from each other (referring to FIG. 4).

B-3. Standard Test of Burst Strength

Tests of burst strength were performed on the films prepared in Comparative Example 1-1, Comparative Example 1-2 and Example 1-1, and the commercial sealing patch in clinical use at present (TissuePatch) (formed by polylactic acid (PLA), two layer structure, attachment effect is achieved by chemical covalent bonds) according to Standard Test Method for Burst Strength of Surgical Sealants defined by ASTM F2392.

Operation procedure for test of burst strength according to ASTM F2392 is summarized in the following.

The film to be tested was cut into a round piece with a diameter of 1.5 cm, and then the round piece was attached to pig intestines and kept at 37° C. for 15 minutes to prepare a pig intestine test sample. Next, the prepared pig intestine test sample was set on a testing mold for water pressure, and the burst test was performed on the testing mold for water pressure by a peristaltic pump with a flow rate of 3 ml/minute.

Figure 5:
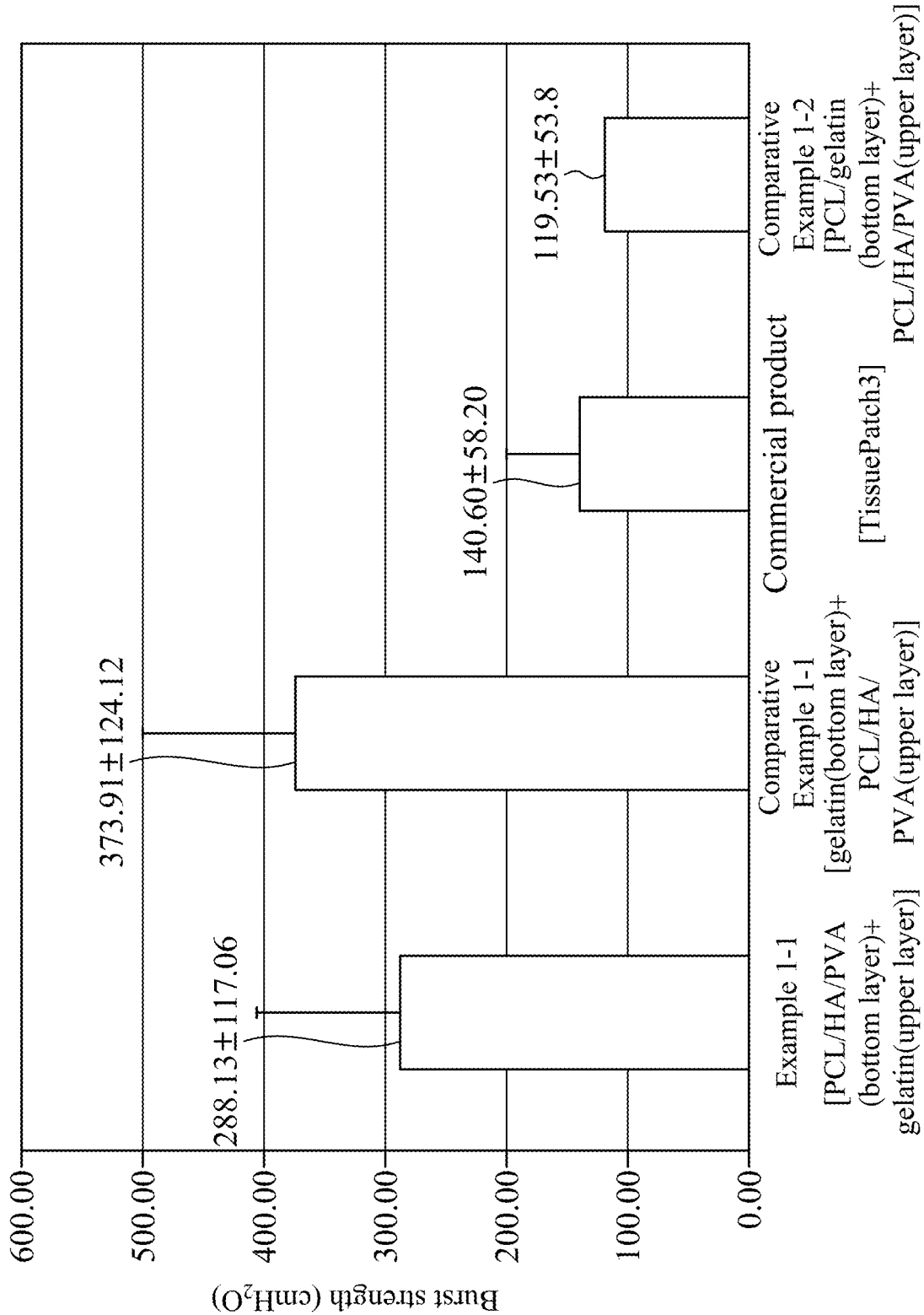
FIG. 5 shows the burst strengths of the films prepared in Comparative Example 1-1, Comparative Example 1-2 and Example 1-1 and commercial sealing patch in clinical use at present (TissuePatch)

The results are shown in FIG. 5.

Based on FIG. 5, it is known that the burst strength of the film prepared in the specific order of forming each layer of the present disclosure (Example 1-1) is higher than that of the film prepared in reverse order of forming each layer (Comparative Example 1-2) and is higher than that of the commercial sealing patch (TissuePatch). Although the burst strength of the film prepared by Comparative Example 1-1 is higher than that of the film prepared by Example 1-1, delamination occurs between the layers of the film prepared by Comparative Example 1-1 as mentioned above.

C. Triple Layer Film Containing PCL/HA/PVA Bottom Layer+PCL/Gelatin Intermediate Layer+Gelatin Upper Layer C-1. Preparation of Triple Layer Film Example 2-1

Triple layer film containing PCL/HA bottom layer+PCl/gelatin intermediate layer+gelatin upper layer (no PVA solution was used, 0% PVA solution)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) was added to 10 ml of deionized water (DDW) and heated in an oven at 50° C. for 12 hours to be dissolved, and preparation of a 1% hyaluronic acid (HA) solution was completed.

(3) The 1% hyaluronic acid (HA) solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as an upper, and a triple layer film was obtained (the thickness of each layer before drying is about 150 μm (thickness of the scraper), and the thickness of each layer after drying to form a film is about 30 μm).

Example 2-2

Triple layer film containing PCl/HA/PVA bottom layer+ PCL/gelatin intermediate layer+gelatin upper layer (1% PVA solution was used)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as an upper layer, and a triple layer film was obtained (the thickness of each layer before drying is about 150 μm (thickness of the scraper), and the thickness of each layer after drying to form a film is about 30 μm).

Example 2-3

Triple layer film containing PCL/HA/PVA bottom layer+ PCL/gelatin intermediate layer+gelatin upper layer (2% PVA solution was used)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.2 g of polyvinyl alcohol (PVA) were added to 10 ml of deionized water (DDW) and heated in an oven at 50° C. for 12 hours to be dissolved, and preparation of a solution containing 1% hyaluronic acid (HA) and 2% polyvinyl alcohol (PVA) was completed.

(3) The solution containing 1% hyaluronic acid (HA) and 2% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as an upper layer, and a triple layer film was obtained (the thickness of each layer before drying is about 150 μm (thickness of the scraper), and the thickness of each layer after drying to form a film is about 30 μm).

C-2. Observation of Film Formation

Whether the processes of Example 2-1, Example 2-2 and Example 2-3 are capable of forming a film was observed. The results are shown in FIG. 6.

Figure 6:
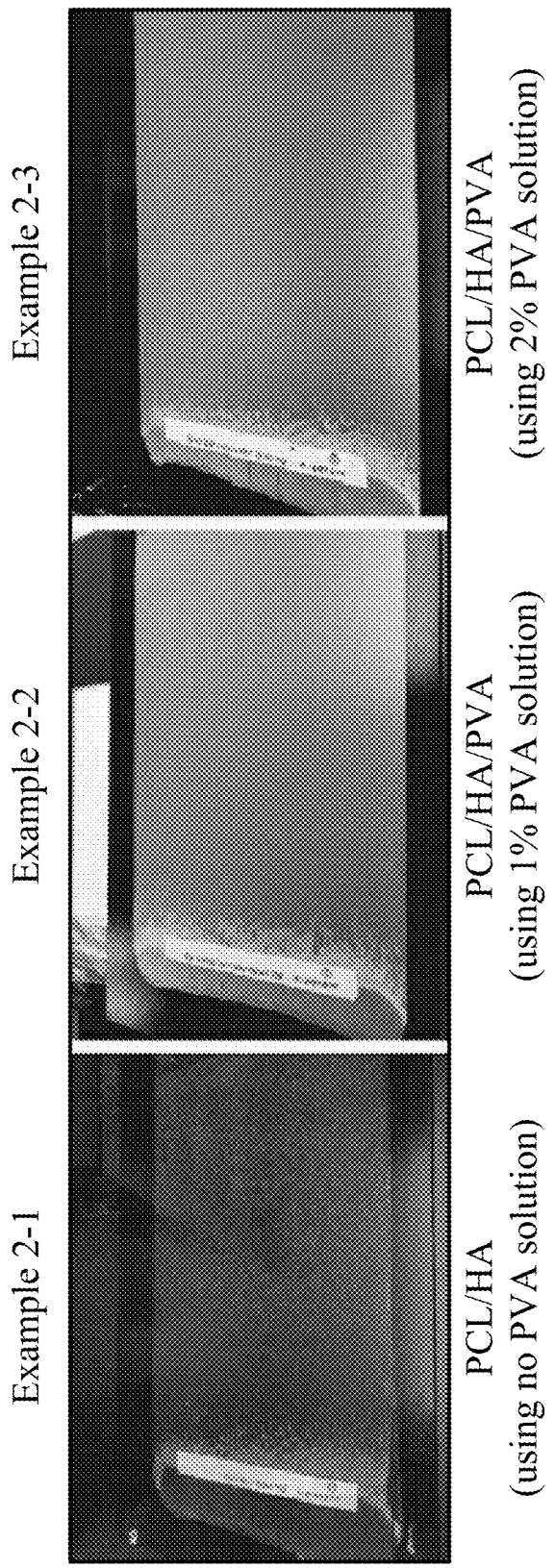
FIG. 6 shows the observation results of film formations in the process of Examples 2-1 to 2-3.

Based on FIG. 6, it is known that the processes of Examples 2-1 to 2-3 (using 0%, 1% and 2% PVA solutions, respectively) all are capable of forming films, wherein the surface of the film formed by 1% PVA solution is most even.

D. Triple Layer Film Containing PLGA/HA/PVA Bottom Layer+PLGA/Gelatin Intermediate Layer+Gelatin Upper Layer and Triple Layer Film Containing PLA/HA/PVA Bottom Layer+PLA/Gelatin Intermediate Layer+Gelatin Upper Layer D-1. Preparation of Triple Layer Film Example 3-1

Triple layer film containing PLGA/HA/PVA bottom layer+PLGA/gelatin intermediate layer+gelatin upper layer (10% PLGA solution was used)

1. Formation of Bottom Layer (Anti-Adhesion Layer)

(1) 2 g of poly(lactic-co-glycolic acid) (PLGA) was added to 20 ml of dichloromethane (DCM), and then mixed at 50 rpm for 12 hours, and preparation of a 10% poly(lactic-co-glycolic acid) (PLGA) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and polyvinyl alcohol (PVA) was removed from the oven and poured into the 10% poly(lactic-co-glycolic acid) (PLGA) solution (time for taking the solution out and pouring it to the poly(lactic-co-glycolic acid) (PLGA) solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 1.2 g of poly(lactic-co-glycolic acid) (PLGA) was added to 12 ml of dichloromethane (DCM), and then mixed at 50 rpm for 12 hours, and preparation of a 10% poly(lactic-co-glycolic acid) (PLGA) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 10% poly(lactic-co-glycolic acid) (PLGA) solution (time for taking the solution out and pouring it to the poly(lactic-co-glycolic acid) (PLGA) solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer, and a triple layer film was obtained (the thickness of each layer before drying is about 150 μm (thickness of the scraper), and the thickness of each layer after drying to form a film is about 30 μm).

Example 3-2

Triple layer film containing PLGA/HA/PVA bottom layer+PLGA/gelatin intermediate layer+gelatin upper layer (15% PLGA solution was used)

Except that in the formation of the bottom layer (anti-adhesion layer) and the intermediate layer, a 15% PLGA solution was used (in the formation of bottom layer (anti-adhesion layer), 3 g of poly(lactic-co-glycolic acid) (PLGA) was added to 20 ml of dichloromethane (DCM), and in the formation of the intermediate layer 1.8 g of poly(lactic-co-glycolic acid) (PLGA) was added to 12 ml of dichloromethane (DCM)), other processes are all the same as those of Example 3-1 (the thickness of each layer before drying is about 150 μm (thickness of the scraper), and the thickness of each layer after drying to form a film is about 30 μm).

Example 3-3

Triple layer film containing PLGA/HA/PVA bottom layer+PLGA/gelatin intermediate layer+gelatin upper layer (20% PLGA solution was used)

Except that in the formation of the bottom layer (anti-adhesion layer) and the intermediate layer, a 15% PLGA solution was used (in the formation of bottom layer (anti-adhesion layer), 4 g of poly(lactic-co-glycolic acid) (PLGA) was added to 20 ml of dichloromethane (DCM), and in the formation of the intermediate layer 2.4 g of poly(lactic-co-glycolic acid) (PLGA) was added to 12 ml of dichloromethane (DCM)), other processes are all the same as those of Example 3-1 (the thickness of each layer before drying is about 150 μm (thickness of the scraper), and the thickness of each layer after drying to form a film is about 30 μm).

Example 4-1

Triple layer film containing PLA/HA/PVA bottom layer+PLA/gelatin intermediate layer+gelatin upper layer (10% PLA solution was used)

1. Formation of Bottom Layer (Anti-Adhesion Layer)

(1) 2 g of polylactic acid (PLA) (PDL20, 1.6-2.4 dl/g, Corbion) was added to 20 ml of dichloromethane (DCM), and then mixed at 50 rpm for 12 hours, and preparation of a 10% polylactic acid (PLA) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 10% polylactic acid (PLA) solution (time for taking the solution out and pouring it to the polylactic acid (PLA) solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 1.2 g of polylactic acid (PLA) was added to 12 ml of dichloromethane (DCM) and then mixed at 50 rpm for 12 hours, and preparation of a 10% polylactic acid (PLA) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 10% polylactic acid (PLA) solution (time for taking the solution out and pouring it to the polylactic acid (PLA) solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer, and a triple layer film was obtained (the thickness of each layer before drying is about 150 μm (thickness of the scraper), and the thickness of each layer after drying to form a film is about 30 μm).

Example 4-2

Triple layer film containing PLA/HA/PVA bottom layer+PLA/gelatin intermediate layer+gelatin upper layer (15% PLA solution was used)

Except that in the formation of the bottom layer (anti-adhesion layer) and the intermediate layer, a 15% PLA solution was used (in the formation of bottom layer (anti-adhesion layer), 3 g of polylactic acid (PLA) was added to 20 ml of dichloromethane (DCM), and in the formation of the intermediate layer 1.8 g of polylactic acid (PLA) was added to 12 ml of dichloromethane (DCM)), other processes are all the same as those of Example 4-1 (the thickness of each layer before drying is about 150 μm (thickness of the scraper), and the thickness of each layer after drying to form a film is about 30 μm).

Example 4-3

Triple layer film containing PLA/HA/PVA bottom layer+PLA/gelatin intermediate layer+gelatin upper layer (20% PLA solution was used)

Except that in the formation of the bottom layer (anti-adhesion layer) and the intermediate layer, a 15% PLA solution was used (in the formation of bottom layer (anti-adhesion layer), 4 g of polylactic acid (PLA) was added to 20 ml of dichloromethane (DCM), and in the formation of the intermediate layer 2.4 g of polylactic acid (PLA) was added to 12 ml of dichloromethane (DCM)), other processes are all the same as those of Example 4-1 (the thickness of each layer before drying is about 150 μm (thickness of the scraper), and the thickness of each layer after drying to form a film is about 30 μm).

D-2. Observation of Film Formation

Whether the processes of Examples 3-1 to 3-3 and Examples 4-1 to 4-3 are capable of forming a film was observed. The results are shown in FIG. 7.

Based on FIG. 7, it is known that except for Example 4-3, the processes of Examples 3-1 to 3-3 (using 10-20% PLGA solutions, respectively) and Examples 4-1 to 4-2 (using 10-20% PGA solutions, respectively) all are capable of forming films.

E. Triple layer film containing PCL/HA/PVA bottom layer+PCL/gelatin intermediate layer+CMC upper layer and triple layer film containing PCL/HA/PVA bottom layer+PCL/gelatin intermediate layer+collagen upper layer E-1. Preparation of Triple Layer Film Example 5-1

Triple layer film containing PCL/HA/PVA bottom layer+PCL/gelatin intermediate layer+CMC upper layer (1% CMC solution was used)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 0.1 g of carboxymethyl cellulose (CMC) was added to 10 ml of deionized water (DDW), and heated in an oven at 50° C. for 12 hours to be dissolved, and preparation of a 1% carboxymethyl cellulose (CMC) solution was completed.

(2) The 1% carboxymethyl cellulose (CMC) solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer, and a triple layer film was obtained (the thickness of each layer before drying is about 150 μm (thickness of the scraper), and the thickness of each layer after drying to form a film is about 30 μm).

Example 5-2

Triple layer film containing PCL/HA/PVA bottom layer+PCL/gelatin intermediate layer+CMC upper layer (2% CMC solution was used)

Except that in the formation of upper layer (attachment layer), a 2% carboxymethyl cellulose (CMC) solution was used (in the formation of upper layer (attachment layer), 0.2 g of carboxymethyl cellulose (CMC) was added to 10 ml of deionized water (DDW)), other processes are all the same as those of Example 5-1 (the thickness of each layer before drying is about 150 μm (thickness of the scraper), and the thickness of each layer after drying to form a film is about 30 μm).

Example 5-3

Triple layer film containing PCL/HA/PVA bottom layer+PCL/gelatin intermediate layer+CMC upper layer (3% CMC solution was used)

Except that in the formation of upper layer (attachment layer), a 3% carboxymethyl cellulose (CMC) solution was used (in the formation of upper layer (attachment layer), 0.3 g of carboxymethyl cellulose (CMC) was added to 10 ml of deionized water (DDW)), other processes are all the same as those of Example 5-1 (the thickness of each layer before drying is about 150 μm (thickness of the scraper), and the thickness of each layer after drying to form a film is about 30 Jim).

Example 5-4

Triple layer film containing PCL/HA/PVA bottom layer+PCL/gelatin intermediate layer+CMC upper layer (4% CMC solution was used)

Except that in the formation of upper layer (attachment layer), a 4% carboxymethyl cellulose (CMC) solution was used (in the formation of upper layer (attachment layer), 0.4 g of carboxymethyl cellulose (CMC) was added to 10 ml of deionized water (DDW)), other processes are all the same as those of Example 5-1 (the thickness of each layer before drying is about 150 μm (thickness of the scraper), and the thickness of each layer after drying to form a film is about 30 μm).

Example 5-5

Triple layer film containing PCL/HA/PVA bottom layer+ PCL/gelatin intermediate layer+CMC upper layer (5% CMC solution was used)

Except that in the formation of upper layer (attachment layer), a 5% carboxymethyl cellulose (CMC) solution was used (in the formation of upper layer (attachment layer), 0.5 g of carboxymethyl cellulose (CMC) was added to 10 ml of deionized water (DDW)), other processes are all the same as those of Example 5-1 (the thickness of each layer before drying is about 150 μm (thickness of the scraper), and the thickness of each layer after drying to form a film is about 30 μm).

Example 6-1

Triple layer film containing PCL/HA/PVA bottom layer+ PCL/gelatin intermediate layer+collagen upper layer (0.25% collagen solution was used)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 0.025 g of collagen was added to 10 ml of 0.001N HCl aqueous solution and stirred by a homogenizer to be dissolved, and preparation of a 0.25% collagen solution was completed.

(2) The 0.25% collagen solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as an upper layer, and a triple layer film was obtained (the thickness of each layer before drying is about 150 μm (thickness of the scraper), and the thickness of each layer after drying to form a film is about 30 μm).

Example 6-2

Triple layer film containing PCL/HA/PVA bottom layer+ PCL/gelatin intermediate layer+collagen upper layer (0.5% collagen solution was used)

Except that in the formation of upper layer (attachment layer), a 0.5% collagen solution was used (in the formation of upper layer (attachment layer), 0.05 g of collagen was added to 10 ml of 0.001N HCl aqueous solution), other processes are all the same as those of Example 6-1 (the thickness of each layer before drying is about 150 μm (thickness of the scraper), and the thickness of each layer after drying to form a film is about 30 μm).

Example 6-3

Triple layer film containing PCL/HA/PVA bottom layer+ PCL/gelatin intermediate layer+collagen upper layer (0.75% collagen solution was used)

Except that in the formation of upper layer (attachment layer), a 0.75% collagen solution was used (in the formation of upper layer (attachment layer), 0.075 g of collagen was added to 10 ml of 0.001N HCl aqueous solution), other processes are all the same as those of Example 6-1 (the thickness of each layer before drying is about 150 μm (thickness of the scraper), and the thickness of each layer after drying to form a film is about 30 μm).

E-2. Observation of Film Formation

Whether the processes of Examples 5-1 to 5-5 and Examples 6-1 to 6-3 are capable of forming a film was observed. The results are shown in FIG. 8 and FIG. 9.

Figure 8:
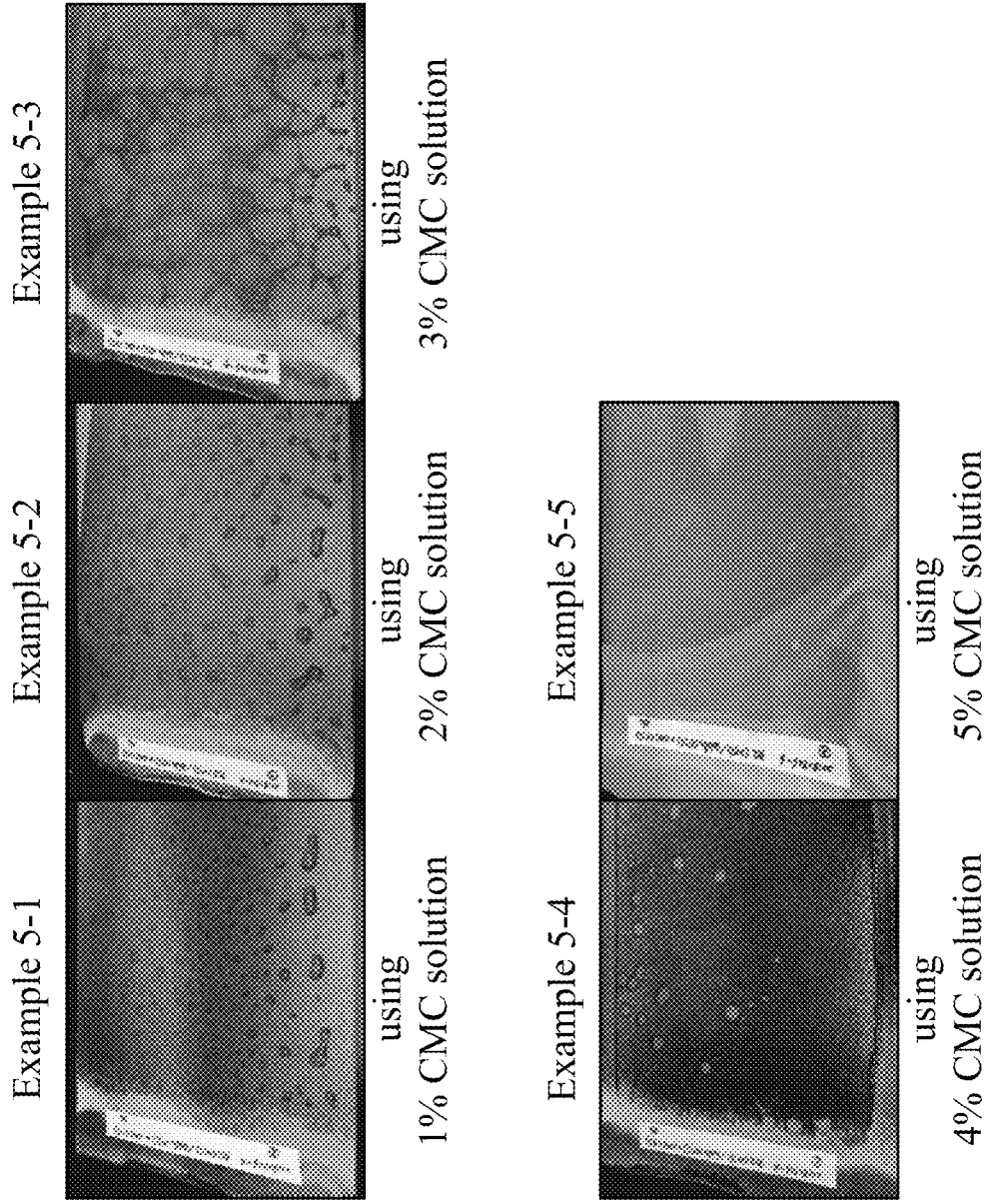
FIG. 8 shows the observation results of film formations in the process of Examples 5-1 to 5-5.
Figure 9:
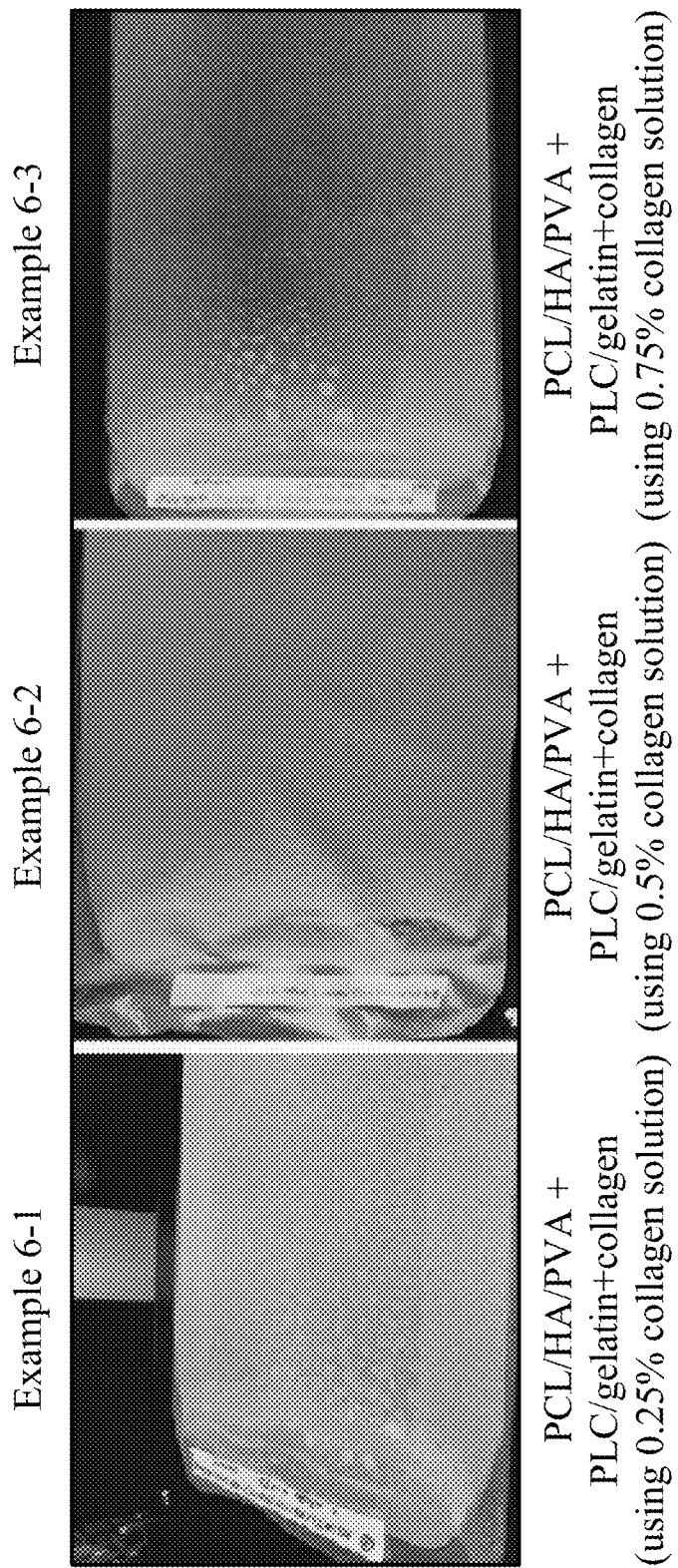
FIG. 9 shows the observation results of film formations in the process of Examples 6-1 to 6-3.

Based on FIG. 8 and FIG. 9, it is known that the processes of Examples 5-1 to 5-5 (using 1-5% CMC solutions, respectively) and Examples 6-1 to 6-3 (using 0.25%, 0.5% and 0.75% collagen solutions, respectively) all are capable of forming films.

F. Triple Layer Film Containing PCL/HA/PVA Bottom Layer+PCL/Gelatin Intermediate Layer+Gelatin-DOPA Upper Layer and Triple Layer Film Containing PCL/HA/PVA Bottom Layer+PCL/Gelatin Intermediate Layer+Gelatin-GA Upper Layer F-1. Preparation of Triple Layer Film Example 7-1

Triple layer film containing PCL/HA/PVA bottom layer+PCL/gelatin intermediate layer+gelatin-DOPA upper layer 1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin-DOPA was added to 10 ml of deionized water (DDW) and heated in an oven at 50° C. for 12 hours to be dissolved, and preparation of a 37% gelatin solution was completed.

(2) The 37% gelatin-DOPA solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer, and a triple layer film was obtained (the thickness of each layer before drying is about 150 μm (thickness of the scraper), and the thickness of each layer after drying to form a film is about 30 μm).

Example 7-2

Triple layer film containing PCL/HA/PVA bottom layer+PCL/gelatin intermediate layer+gelatin-GA upper layer 1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated at 40-50° C. by water bath while 0.025% glutaraldehyde (GA) solution was added thereto by titration and stirred to perform continuous crosslinking reaction for 1 hour, and then heated in a 50° C. oven for 12-16 hours for dissolution, and preparation of a 37% gelatin-GA solution was completed.

(2) The 37% gelatin-GA solution was removed from the oven and poured onto the foregoing Teflon plate which had a double layer film with an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer, and a triple layer film was obtained (the thickness of each layer before drying is about 150 μm (thickness of the scraper), and the thickness of each layer after drying to form a film is about 30 μm).

G. Triple Layer Film Containing PCl/HA/PVA Layer+PCL/Gelatin Layer+Gelatin Layer G-1. Preparation of Triple Layer Film Comparative Example 2-1

Triple layer film containing gelatin bottom layer+PCL/gelatin intermediate layer+PCL/HA/PVA upper layer (in the film scraping procedure a scraper with a thickness of 150 μm was used)

1. Formation of Bottom Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an attachment layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as an anti-adhesion layer, and a triple layer film was obtained (the thickness of each layer before drying is about 150 μm (thickness of the scraper), and the thickness of each layer after drying to form a film is about 30 μm).

Comparative Example 2-2

Triple layer film containing gelatin bottom layer+PCL/gelatin intermediate layer+PCL/HA/PVA upper layer (in the film scraping procedure a scraper with a thickness of 75 μm was used)

Except that in the film scraping procedures, a scraper with a thickness of 75 μm was used, other processes are all the same as those of Comparative Example 2-1 (the thickness of each layer before drying is about 75 μm (thickness of the scraper), and the thickness of each layer after drying to form a film is about 15 μm).

Example 8-1

Triple layer film containing PCL/HA/PVA bottom layer+PCL/gelatin intermediate layer+gelatin upper layer (in the film scraping procedure a scraper with a thickness of 150 μm was used)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 2.4 g of polycaprolactone (PCL) was added to 12 ml of dichloromethane (DCM), and then mixed at 50 rpm for 12 hours, and preparation of a 20% polycaprolactone (PCL) solution was completed.

(2) 2.22 g of gelatin was added to 6 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 3.7 g of gelatin was added to 10 ml of deionized water (DDW) and heated in an oven at 50° C. for 12 hours to be dissolved, and preparation of a 37% gelatin solution was completed.

(2) The 37% gelatin solution was removed from the oven and poured onto the foregoing Teflon plate which had an anti-adhesion layer and an intermediate layer formed thereon, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form an attachment layer, and a triple layer film was obtained (the thickness of each layer before drying is about 150 μm (thickness of the scraper), and the thickness of each layer after drying to form a film is about 30 μm).

Example 8-2

Triple layer film containing PCl/HA/PVA bottom layer+ PCL/gelatin intermediate layer+gelatin upper layer (in the film scraping procedure a scraper with a thickness of 75 μm was used)

Except that in the film scraping procedures, a scraper with a thickness of 75 μm was used, other processes are all the same as those of Example 8-1 (the thickness of each layer before drying is about 75 μm (thickness of the scraper), and the thickness of each layer after drying to form a film is about 15 μm).

G-2. Delamination Test for Film

Films prepared in Examples 8-1 and 8-2 and Comparative Examples 2-1 and 2-2 were respectively immersed in PBS buffer to observe whether the films were delaminated. The results are shown in Table 2 and FIG. 10.

Figure 10:
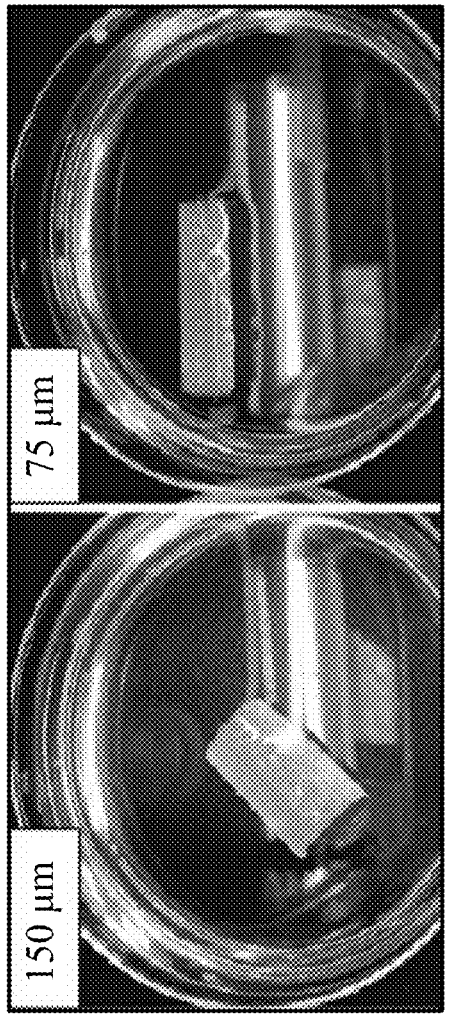
FIG. 10 shows the results of delamination test for films prepared in Examples 8-1 and 8-2 and Comparative Examples 2-1 and 2-2.
Figure 10:
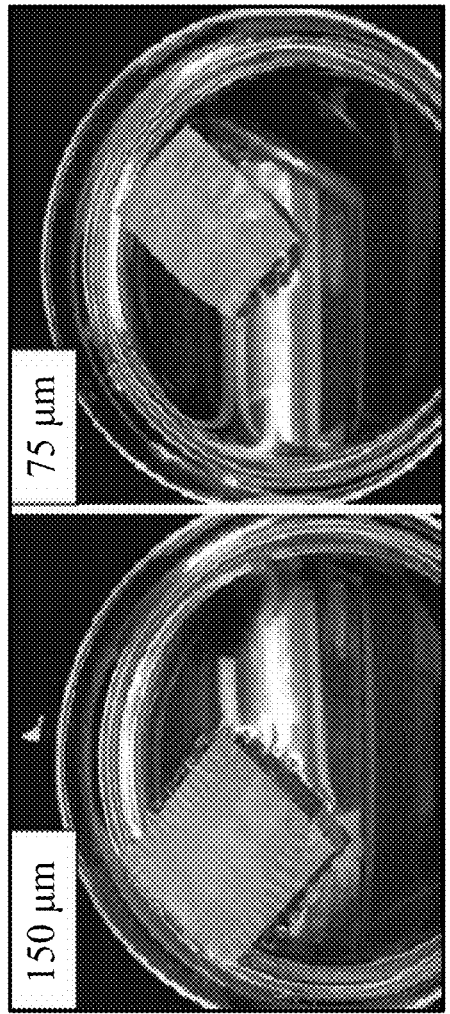

The results show that for the films prepared in the specific order of forming each layer of the present disclosure (Examples 8-1 and 8-2), after being immersed for 30 minutes, separation does not occur between the layers of the films (referring to FIG. 10). Conversely, for the films prepared in reverse order of forming each layer (Comparative Examples 2-1 and 2-2), within 5 minutes of immersion, delamination occurs between the layers of the films, and that results in the layers of the film becoming separated from each other (referring to FIG. 10).

G-3. Standard Test of Burst Strength

Tests of burst strength were performed on the films prepared in Comparative Example 1-2, Example 7-1, Example 7-2, Example 8-1 and Example 8-2, and the commercial sealing patch in clinical use at present (TissuePatch) (formed by polylactic acid (PLA), two layer structure, attachment effect is achieved by chemical covalent bonds) according to Standard Test Method for Burst Strength of Surgical Sealants defined by ASTM F2392.

Operation procedure for test of burst strength according to ASTM F2392 is summarized in the following.

The film to be tested was cut into a round piece with a diameter of 1.5 cm, and then the round piece was attached to pig intestines and kept at 37° C. for 15 minutes to prepare a pig intestine test sample. Next, the prepared pig intestine test sample was set on a testing mold for water pressure, and the burst test was performed on the testing mold for water pressure by a peristaltic pump with a flow rate of 3 ml/minute.

Figure 11A:
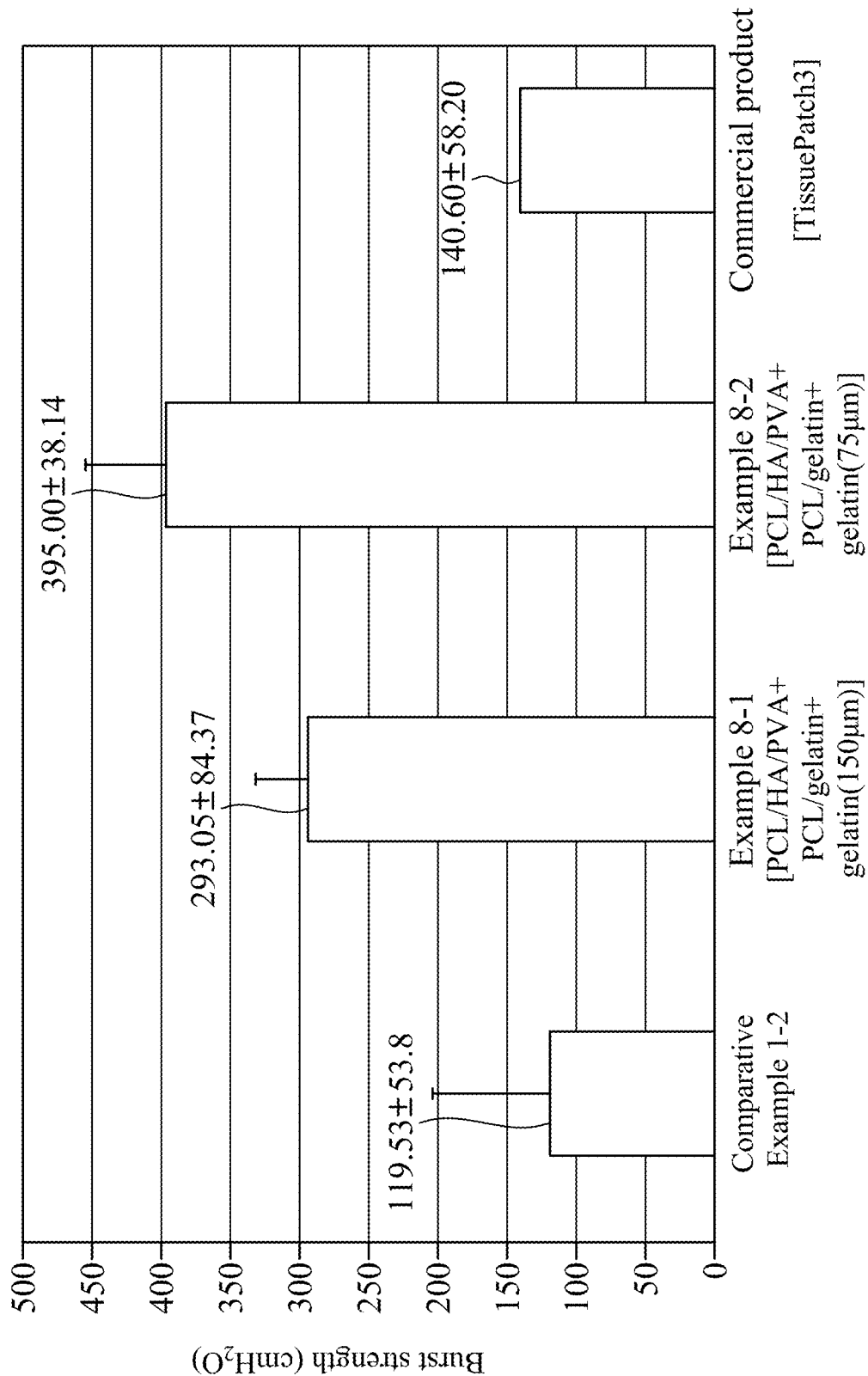
FIG. 11A shows the burst strengths of the films prepared in Comparative Example 1-2, Example 8-1 and Example 8-2 and commercial sealing patch in clinical use at present (TissuePatch)
Figure 11B:
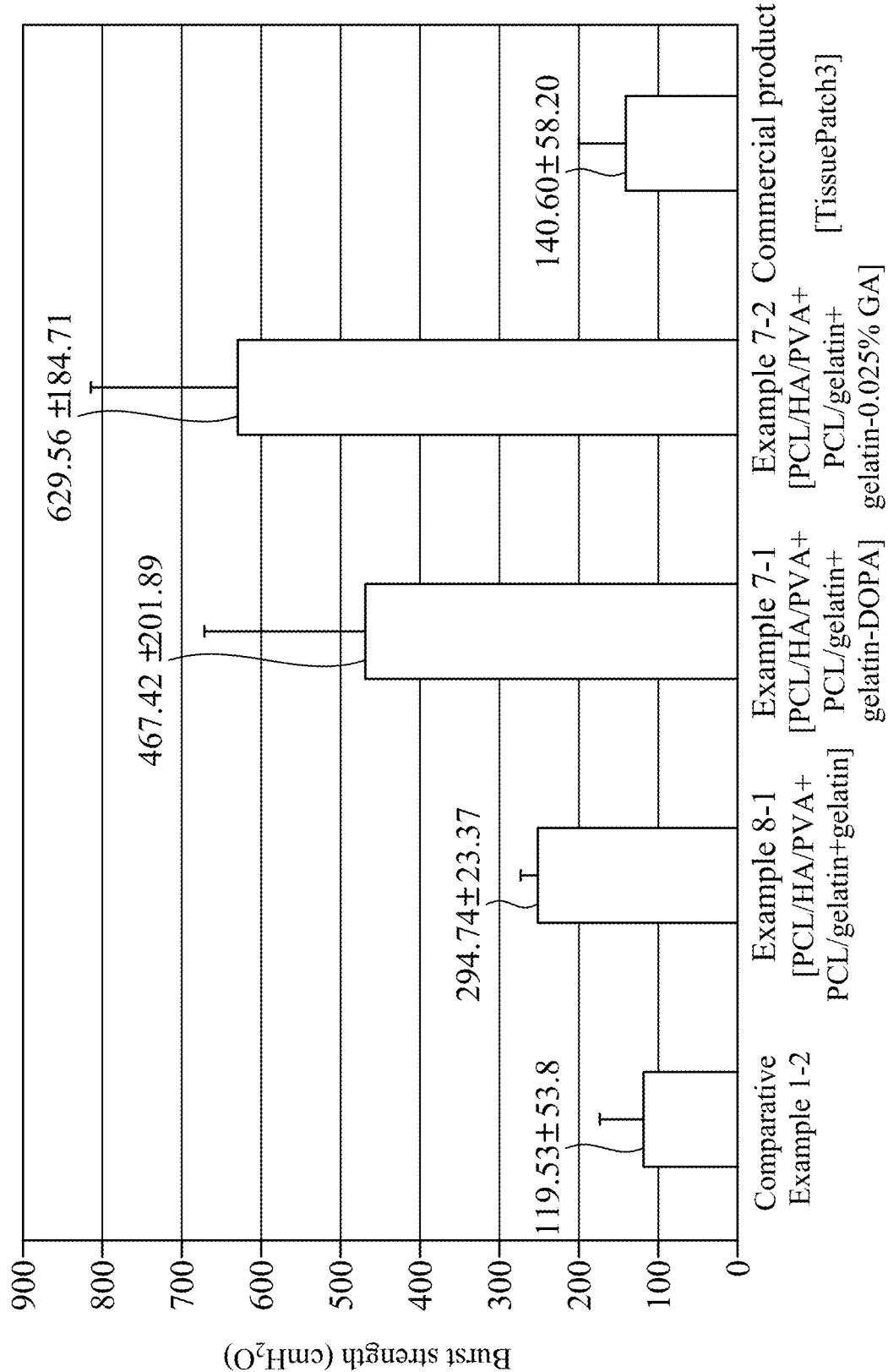
FIG. 11B shows the burst strengths of the films prepared in Comparative Example 1-2, Example 7-1, Example 7-2 and Example 8-1 and commercial sealing patch in clinical use at present (TissuePatch)

The results are shown in FIGS. 11A and 11B.

Based on FIGS. 11A and 11B, it is known that the burst strengths of the films prepared in the specific order of forming each layer of the present disclosure (Example 7-1, Example 7-2, Example 8-1 and Example 8-2) are higher than that of the film prepared in reverse order of forming each layer (Comparative Example 1-2) and are higher than that of the commercial sealing patch (TissuePatch).

G-4. Test of Tensile Strength

Tests of tensile strength were performed on the films prepared in Comparative Example 1-2, Example 8-1 and Example 8-2, and the commercial sealing patch in clinical use at present (TissuePatch) according to Standard Test Method for Tensile Properties of Thin Plastic Sheeting defined by ASTM D882.

Operation procedure for tensile tests according to ASTM D882 is summarized in the following.

TABLE 2

| | Example 8-1 | Example 8-2 | Comparative Example 2-1 | Comparative Example 2-2 |
| | The bottom layer is an anti-adhesion layer | | The bottom layer is an attachment layer | |
| --- | --- | --- | --- | --- |
| Thickness | 150 μm | 75 μm | 150 μm | 75 μm |
| Description for sample | PCL/HA/PVA bottom layer + PCL/gelatin intermediate layer + gelatin upper layer | PCL/HA/PVA bottom layer + PCL/gelatin intermediate layer + gelatin upper layer | gelatin bottom layer + PCL/gelatin intermediate layer + PCL/HA/PVA upper layer | gelatin bottom layer + PCL/gelatin intermediate layer + PCL/HA/PVA upper layer |
| 5 minutes | N | N | Y | Y |
| 10 minutes | N | N | Y | Y |
| 30 minutes | N | N | Y | Y |

N: No delamination occurs
Y: Delamination occurs

ASTM D882 standard is used to determine tensile properties, especially suitable for a plastic film with a thickness of less than 1 mm. Based on this standard, a test specimen was cut into a strip of 150*25.4 mm² by a sharp cutter, and the initial distance between the upper and lower pneumatic chucks were adjusted to 100 mm, and the pulling speed was set to 12.5 mm/minute. The test results are shown in FIG. 12.

Figure 12:
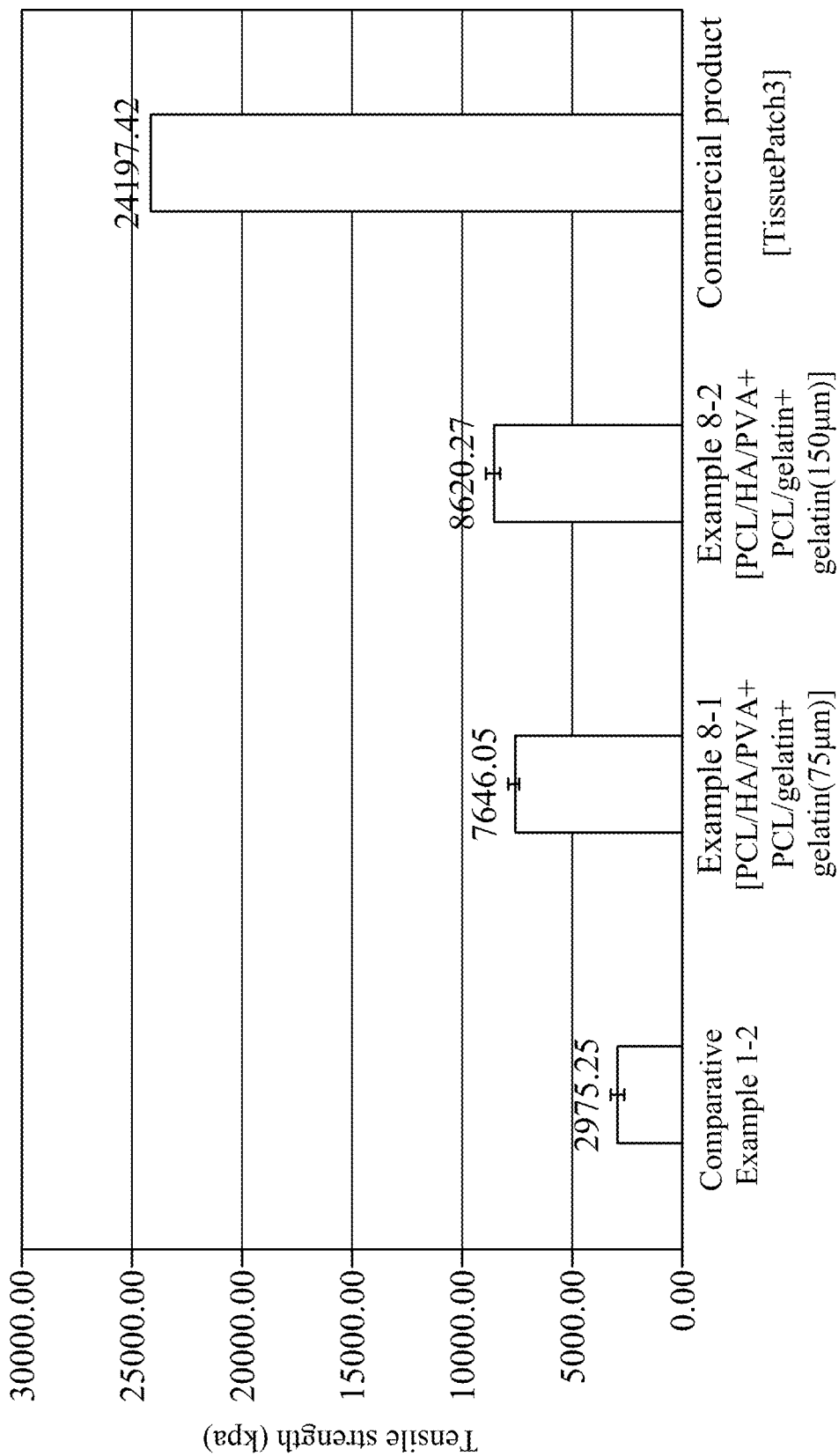
FIG. 12 shows the tensile strengths of the films prepared in Comparative Example 1-2, Example 8-1 and Example 8-2 and commercial sealing patch in clinical use at present (TissuePatch)

FIG. 12 shows that the tensile strengths of the films prepared in the specific order of forming each layer of the present disclosure (Example 8-1 and Example 8-2) are about 2-3 times higher than that of the film prepared in reverse order of forming each layer (Comparative Example 1-2) and are also higher than that of the commercial sealing patch (TissuePatch).

G-5. Tests of Tear Strength

Tests of tear strength were performed on the films prepared in Comparative Example 1-2, Example 8-1 and Example 8-2, and the commercial sealing patch in clinical use at present (TissuePatch) based on Standard Test Method for Tensile Properties of Tin Plastic Sheeting defined by ASTM D1004.

Operation procedure for tests of tear strength according to ASTM D1004 is summarized in the following.

Tests of tear strength were performed according to ASTM D1004. The test specimen was designed based on the standard content, the test of tear strength was performed by an universal tensile testing machine by a tensile rate of 51 mm±5%/minute. The results are shown in FIG. 13.

Figure 13:
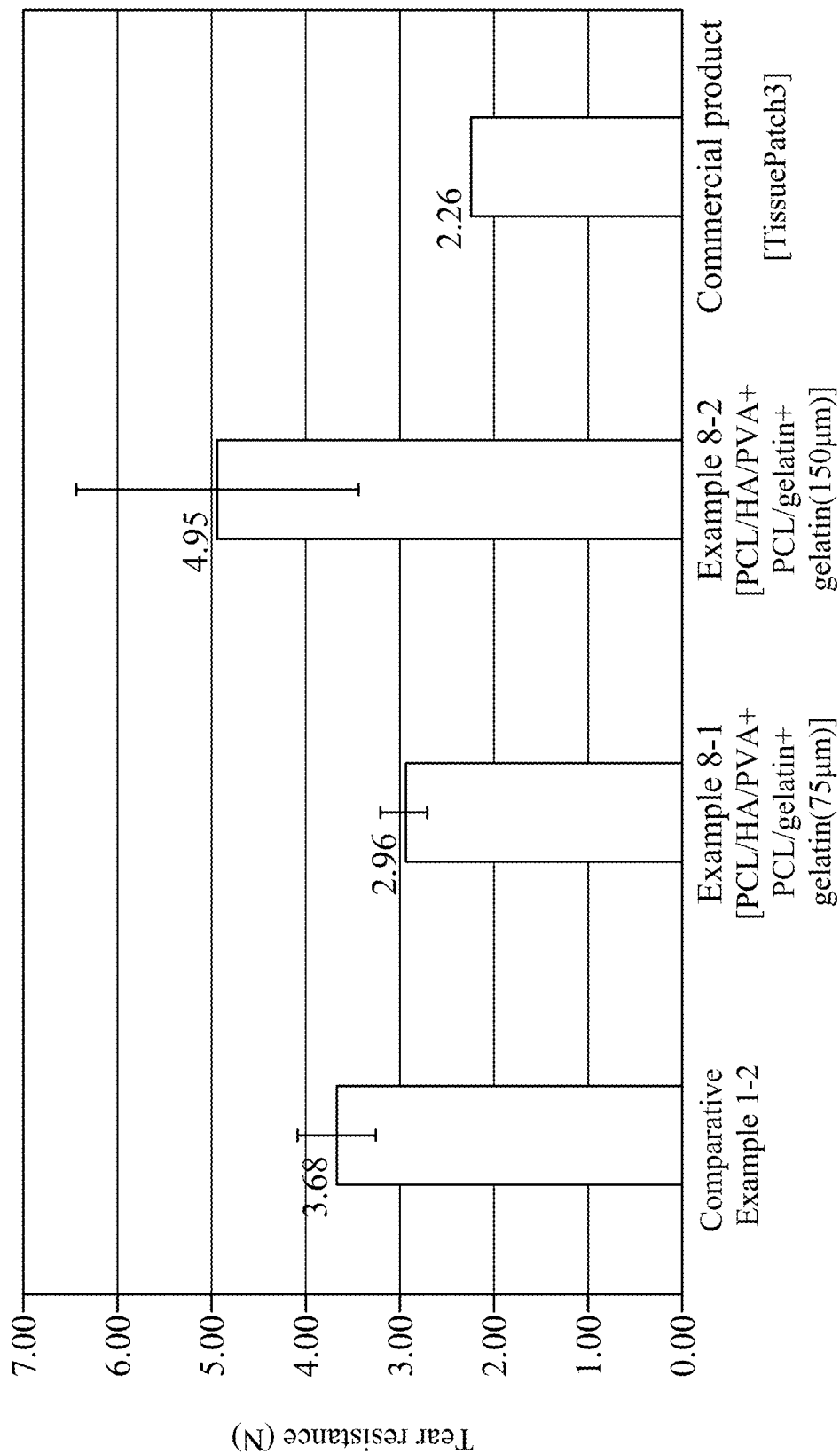
FIG. 13 shows the tear resistances of the films prepared in Comparative Example 1-2, Example 8-1 and Example 8-2 and commercial sealing patch in clinical use at present (TissuePatch)

Based on FIG. 13, it is known that the tear strength of the films prepared in the specific order of forming each layer of the present disclosure (Example 8-1 and Example 8-2) are about 1 time to 1.5 times higher than that of the film prepared in reverse order of forming each layer (Comparative Example 1-2) and are also higher than that of the commercial sealing patch (TissuePatch).

H. Triple Layer Film Containing PCL/HA/PVA Bottom Layer+PCL/Gelatin Intermediate Layer+Collagen Upper Layer H-1. Preparation of Triple Layer Film Example 9-1

Triple layer film containing PCL/HA/PVA bottom layer+PCL/collagen intermediate layer+collagen upper layer (in the film scraping procedure a scraper with a thickness of 150 µm was used)

1. Formation of Bottom Layer (Anti-Adhesion Layer)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 µm at a scraping rate of 35 mm/second to perform a film scraping procedure, and after that, left to stand in a fume hood for 20 minutes to volatilize the solvent to form an anti-adhesion layer as a bottom layer.

2. Formation of Intermediate Layer (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.05 g of collagen was added to 10 ml of 0.001N HCl aqueous solution and stirred by a homogenizer to be dissolved, and preparation of a 0.5% collagen solution was completed.

(3) The 0.5% collagen solution was poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto the foregoing Teflon plate which had an anti-adhesion layer formed thereon, and scraped by a semi-automatic film scraping machine having a scraper with a thickness of 150 µm at a scraping rate of 35 mm/second to perform a film scraping procedure, and after that, left to stand in a fume hood for 20 minutes to volatilize the solvent to form an intermediate layer.

3. Formation of Upper Layer (Attachment Layer)

(1) 0.05 g of collagen was added to 10 ml of 0.001N HCl aqueous solution and stirred by a homogenizer to be dissolved, and preparation of a 0.5% collagen solution was completed.

(2) The 0.5% collagen solution was poured onto the foregoing Teflon plate which had a double layer film with anti-adhesion layer and intermediate layer formed thereon, and scraped by a semi-automatic film scraping machine having a scraper with a thickness of 150 µm at a scraping rate of 35 mm/second to perform a film scraping procedure, and after that, left to stand in a fume hood for 20 minutes to volatilize the solvent to form an attachment layer as an upper layer, and a triple layer film was obtained (the thickness of each layer before drying is about 150 µm (thickness of the scraper), and the thickness of each layer after drying to form a film is about 30 µm).

H-2. Observation of Film Formation

Whether the process of Example 9-1 is capable of forming a film was observed. The result is shown in FIG. 14.

Figure 14:
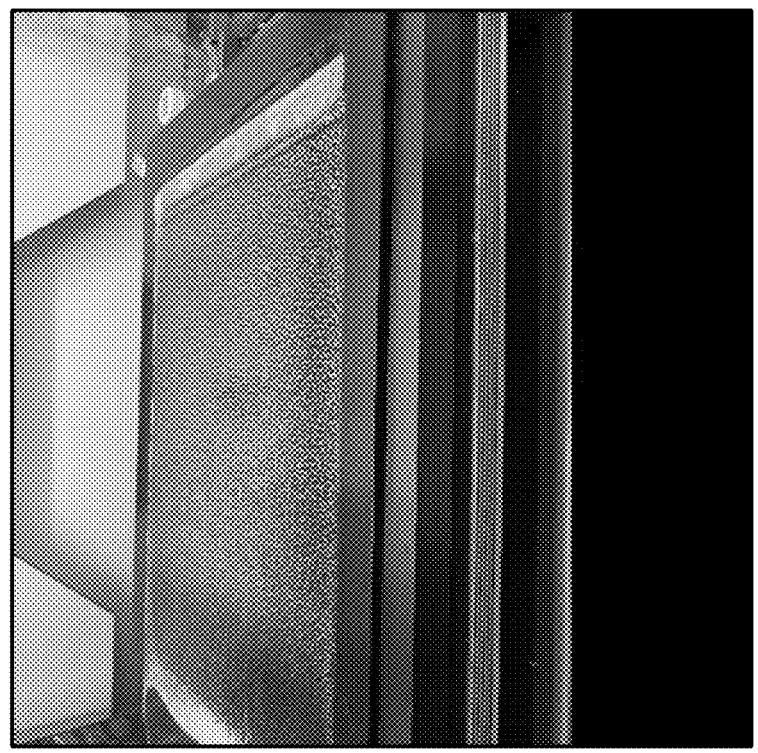
FIG. 14 shows the observation result of film formation in the process of Example 9-1.

Based on FIG. 14, it is known that the processes of Example 9-1 (using 0.5% collagen solution) are capable of forming a film.

I. Cell Attachment Test for Film

I-1. Preparation of Various Films Containing Different Ingredients

A pure PCL film, a PCL/gelatin film, a PCL/HA film, a PCL/HA/PVA (using 1% PVA solution) film, a PCL/HA/PVA (using 2% PVA solution) film, a PCL/CMC/PEG film and a PCL/CMC/PEO film were prepared.

The methods for preparing the respective films are described in the following:

1. Preparation of Pure PCL Film (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) The 20% polycaprolactone (PCL) solution was poured onto a Teflon plate, and scraped by a semi-automatic film scraping machine having a scraper with a thickness of 150 µm at a scraping rate of 35 mm/second to perform a film scraping procedure, and after that, left to stand in a fume hood for 20 minutes to volatilize the solvent to form a single layer of pure PCL film.

2. Preparation of PCL/Gelatin Film (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 3.7 g of gelatin was added to 10 ml of deionized water (DDW) and heated in an oven at 50° C. for 12 hours to be dissolved, and preparation of a 37% gelatin solution was completed.

(3) The 37% gelatin solution was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form a single layer of PCL/gelatin film.

3. Preparation of PCL/HA Film (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) was added to 10 ml of deionized water (DDW) and heated in an oven at 50° C. for 12 hours to be dissolved, and preparation of a solution containing 1% hyaluronic acid (HA) was completed.

(3) The solution containing 1% hyaluronic acid (HA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form a single layer of PCL/HA film.

4. Preparation of PCL/HA/PVA Film (Using 1% PVA Solution)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.1 g of polyvinyl alcohol (PVA) were added to 10 ml of deionized water (DDW) and heated in an oven at 50° C. for 12 hours to be dissolved, and preparation of a solution containing 1% hyaluronic acid (HA) and 1% polyvinyl alcohol (PVA) was completed.

(3) The solution containing 1% hyaluronic acid (HA) and 1% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form a single layer of PCL/HA/PVA film (using 1% PVA solution).

5. Preparation of PCL/HA/PVA Film (Using 2% PVA Solution)

(1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of hyaluronic acid (HA) and 0.2 g of polyvinyl alcohol (PVA) were added to 10 ml of deionized water (DDW) and heated in an oven at 50° C. for 12 hours to be dissolved, and preparation of a solution containing 1% hyaluronic acid (HA) and 2% polyvinyl alcohol (PVA) was completed.

(3) The solution containing 1% hyaluronic acid (HA) and 2% polyvinyl alcohol (PVA) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form a single layer of PCL/HA/PVA film (using 2% PVA solution).

6. Preparation of PCL/CMC/PEG Film (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of carboxymethyl cellulose (CMC) and 0.2 g of polyethylene glycol (PEG) were added to 10 ml of deionized water (DDW), and heated in an oven at 50° C. for 12 hours to be dissolved, and preparation of a solution containing 1% carboxymethyl cellulose (CMC) and 2% polyethylene glycol (PEG) was completed.

(3) The solution containing 1% carboxymethyl cellulose (CMC) and 2% polyethylene glycol (PEG) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form a single layer of PCL/CMC/PEG film.

7. Preparation of PCL/CMC/PEO Film (1) 4 g of polycaprolactone (PCL) was added to 20 ml of dichloromethane (DCM), and then mixed at 50 rpm for 12 hours, and preparation of a 20% polycaprolactone (PCL) solution was completed.

(2) 0.1 g of carboxymethyl cellulose (CMC) and 0.2 g of poly(ethylene oxide) (PEO) were added to 10 ml of deionized water (DDW) and heated in an oven at 50° C. for 12 hours to be dissolved, and preparation of a solution containing 1% carboxymethyl cellulose (CMC) and 2% poly (ethylene oxide) (PEO) was completed.

(3) The solution containing 1% carboxymethyl cellulose (CMC) and 2% poly(ethylene oxide) (PEO) was removed from the oven and poured into the 20% polycaprolactone solution (time for taking the solution out and pouring it to the 20% polycaprolactone solution had to be in 1 minute) to be mixed and stirred (time for stirring was 1 minute to 1 and a half minutes) to form a mixture.

(4) The mixture was poured onto a Teflon plate, and scraped by a semi-automatic film scraping machine having a scraper with a thickness of 150 μm at a scraping rate of 35 mm/second to perform a film scraping procedure, and after that, left to stand in a fume hood for 20 minutes to volatilize the solvent to form a single layer of PCL/CMC/PEO film.

I-2. Cell Attachment Test

Cell attachment test was performed by fibroblasts (L929). Test area for film was 1.9 cm$^2$. The film to be tested was placed at the bottom of the culture plate and then cells ($8\times10^4$ cells) were added thereto for culturing. After culturing for 24 hours, the film was taken out and washed with PBS twice, and then stained by phalloidin to stain the cells attached to the film.

After staining, the film was observed by a fluorescence microscope and recorded, and then quantified by Image J.

Figure 15:
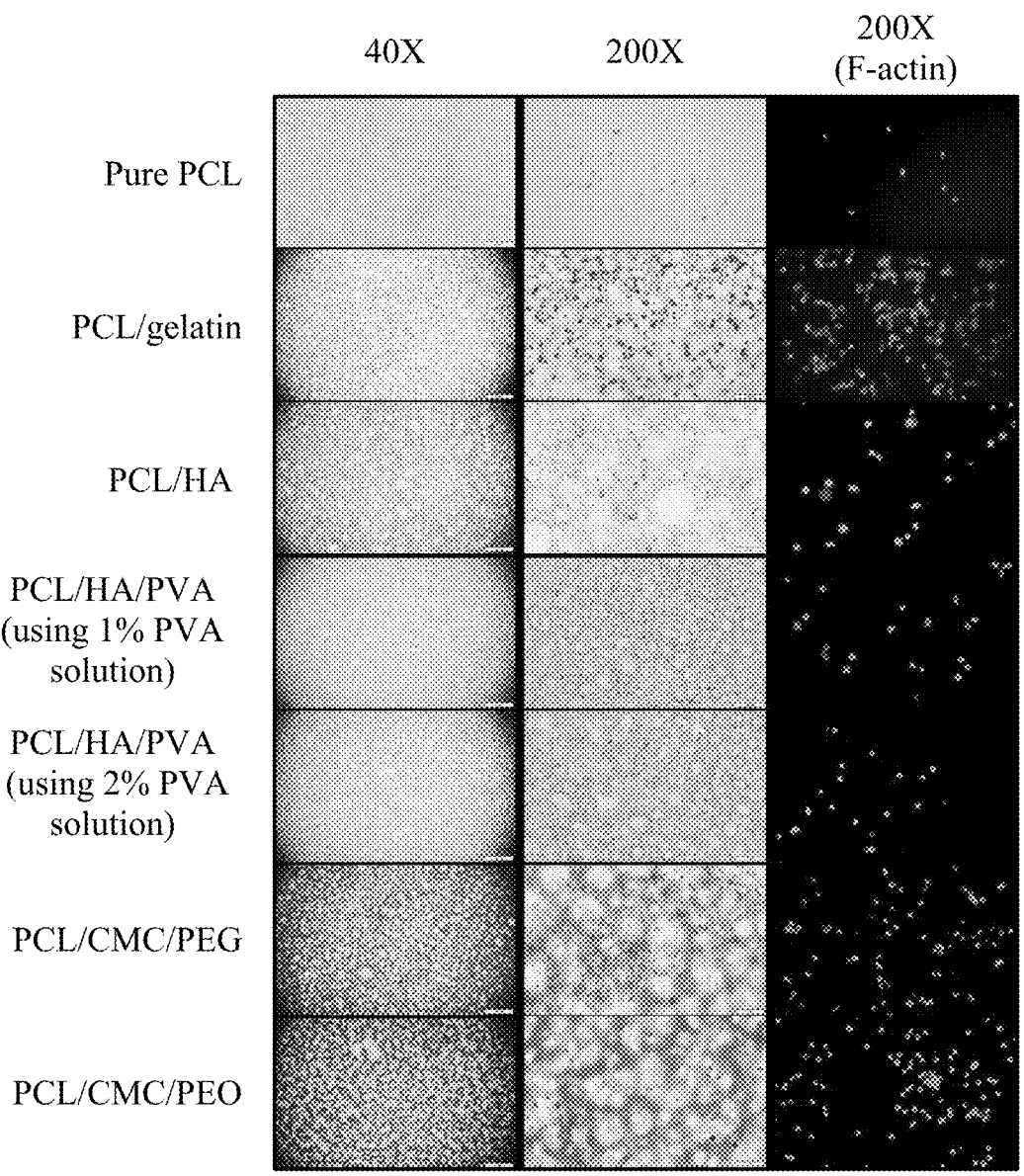
FIG. 15 shows the results of cell staining for different films in the cell attachment test for film.
Figure 16:
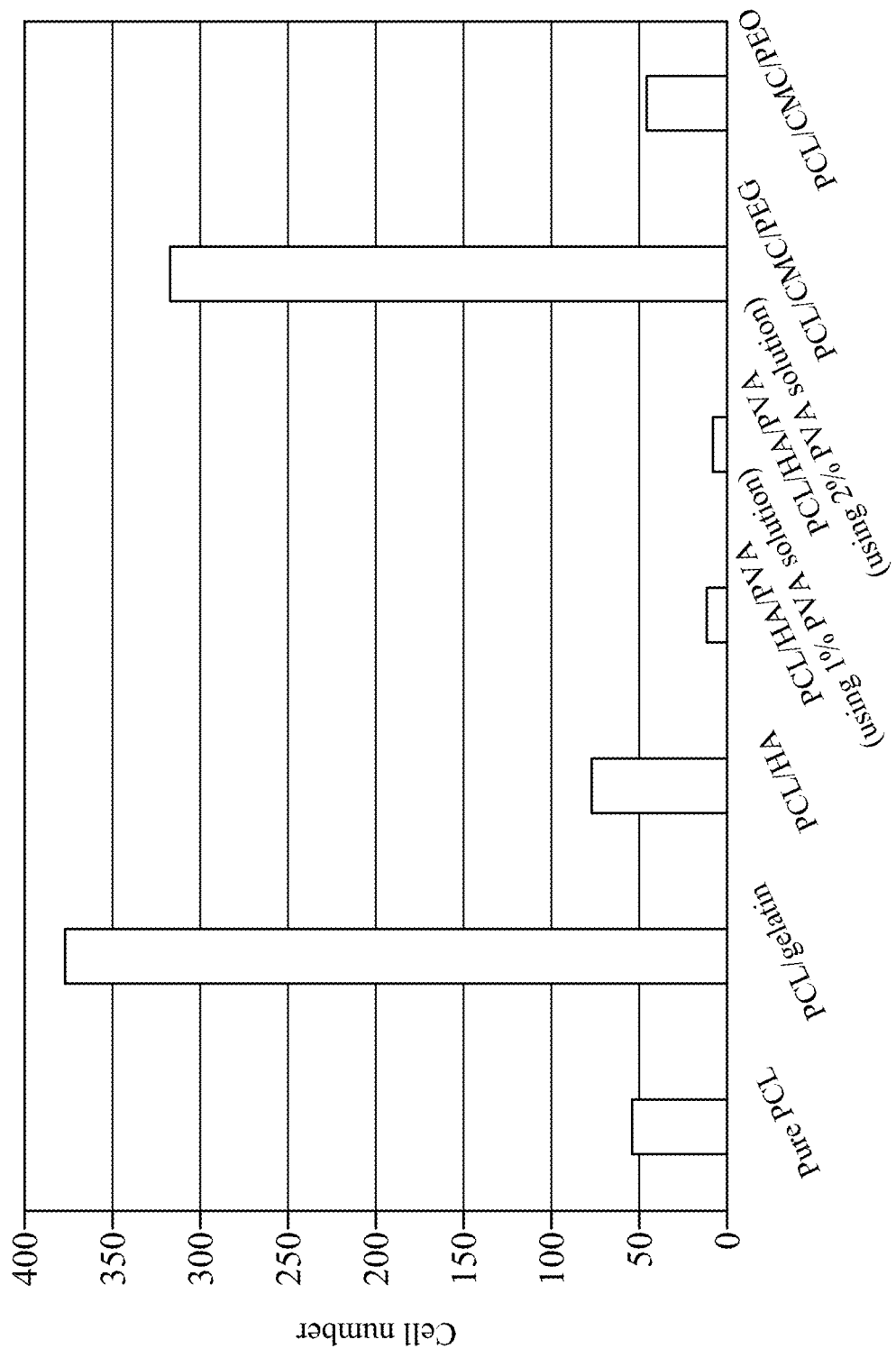
FIG. 16 shows the numbers of cells attached to different films in the cell attachment test for film.

The results of fluorescent staining of each film are shown in FIG. 15, and the number of cells attached to each film is shown in FIG. 16.

According to FIG. 15 and FIG. 16, it is known that the PCL/gelatin film and the PCL/CMC/PEG film can be well attached by the cells and can be used as an attachment layer, while the numbers of cells attached to PCL/HA film, PCL/HA/PVA (using 1% PVA solution) film and PCl/HA/PVA (using 2% PVA solution) film are less and thus these film can be used as an anti-adhesion layer, wherein the PCL/HA/1% PVA film has the lowest cell number of attachment.

J. Animal Experiment—Anti-Adhesion Effect Test for Film

The anti-adhesion effect test for film was performed in rats, and the execution method is described in the following:

1. Rat aged 6-8 weeks was selected.
2. Rat was anesthetized with 0.4 ml/kg anesthetic.
3. After anesthesia, the rat was shaved. After shaving, the hair was removed and the rats were placed on a sterile workbench.
4. Iodine tincture was used to sterilize the abdominal surface of rat scheduled for abdominal surgery.
5. An open surgery was performed on the rat. The size of the open wound was about 2 cm, and the open position is below the diaphragm and 0.5 cm right shifted side of the midline of the rat.
6 The position of the intestine of the rat can be seen after the open was created. The large intestine section was identified and section having less mesentery was used as the area for wound simulation.
7. In the selected section of the intestine mentioned above, 30 times of puncture by a 20 G needle in a range of 1.5 cm in length was performed to simulate the common intestinal perforation in clinical practice and the intestinal perforation leakage model was completed.
8. After completing the steps mentioned above, in the experimental group, the film prepared in Example 8-1 (length: 3 cm, width: 2 cm) was used, and the attachment layer of the film was directly attached (not wrap) to the intestinal wound region of the rat for patching. In the control group, no patching was performed (no film implantation).
9. After patching was completed, in the experimental group, the abdominal wound was closed with 4-0 nylon suture. In the control group, no patching was performed (without the implantation of any film) and the abdominal wound closure was performed.
10. After the wound closure was completed, the epidermal wound surface is disinfected and sterilized to complete the animal surgery.
11. Observation was performed at 2 hours and 24 hours after the surgery was completed. The rats can be fed normally after it could do normal activities, and the rat was continuously observed for 28 days.
12. After 28 days, the rat was sacrificed with $CO_2$. After that, the rat was dissected and the rat intestine at the film implantation position/wound position was sampled. After sampling, the sample was subjected to tissue section and H&E staining for observation and analysis. The results are shown in FIG. 17.

Figure 17:
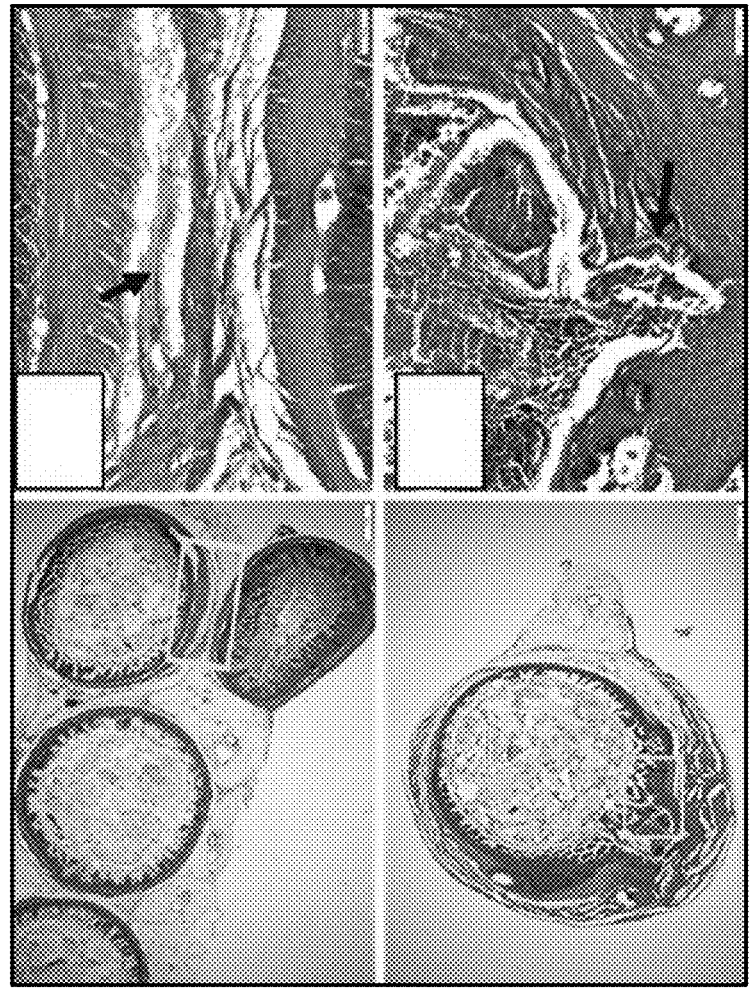
FIG. 17 shows H&E staining results of tissue sections from the film implantation position/wound position of the rat intestine in the anti-adhesion effect test for film.

FIG. 17 shows that in the control group, the formation of connective tissue between the intestinal tissues can be found and the connective tissues cluster together (control group, 100× magnification, indicated by black arrow), while in the experimental group, there are no other intestinal adhesion segments around the intestine and no connective tissue is formed (experimental group, magnification 10×).

Moreover, a wound that simulates enterobrosia was observed, and in the experimental group, no leakage or adhesion occurs in the position of the intestine to which the film is implanted (experimental group, magnification 100×), which means that the film of the present disclosure can effectively seal and repair wounds.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A bifunctional film, comprising:
an anti-adhesion layer; and
an attachment layer over the anti-adhesion layer,
wherein the anti-adhesion layer comprises a first polymer mixture, and the first polymer mixture comprises:
a first hydrophobic polymer which is at least one hydrophobic polymer selected from the group consisting of: polycaprolactone (PCL), polylactic acid (PLA), poly(lactic-co-glycolic acid) (PLGA), poly (glycolic acid) (PGA), polyhydroxybutyrate (PHB), polydioxanone (PDS), poly(propylene fumarate) (PPF), polyanhydrides, polyacetals, poly(ortho esters), polycarbonates, polyurethanes, polyphosphazenes and polyphosphoester; and
a first hydrophilic polymer which is at least one hydrophilic polymer selected from the group consisting of: hyaluronic acid (HA), polyvinyl alcohol (PVA), carboxymethyl cellulose (CMC), polyethylene glycol (PEG), a derivative of polyethylene glycol and poly (ethylene oxide) (PEO), and
in the anti-adhesion layer, a weight ratio of the first hydrophobic polymer to the first hydrophilic polymer is 1:0.01-1,
wherein the anti-adhesion layer is formed by a step of drying a first polymer solution to form a film, and the first polymer solution comprises a first hydrophobic solution and a first hydrophilic solution, and the solute of the first hydrophobic solution is the first hydrophobic polymer, and the solute of the first hydrophilic solution is the first hydrophilic polymer,
wherein the attachment layer consists of a second hydrophilic polymer, and the second hydrophilic polymer is at least one hydrophilic polymer selected from the group consisting of: gelatin, a modified gelatin, alginate, polyvinyl alcohol (PVA), carboxymethyl cellulose (CMC), polyethylene glycol (PEG), a derivative of polyethylene glycol, collagen, demineralized bone matrix (DBM), bone morphogenetic protein (BMP), albumin, chitosan, fibrin, polyoxyethylene and polyvinylpyrrolidone, and wherein the attachment layer is formed by a step of drying a second polymer solution over the anti-adhesion layer to form a film, and the second polymer solution consists of a second hydrophilic solution, and the solute of the second hydrophilic solution is the second hydrophilic polymer.

2. The bifunctional film as claimed in claim 1, the first hydrophobic polymer is polycaprolactone, polylactic acid or poly(lactic-co-glycolic acid).

3. The bifunctional film as claimed in claim 2, wherein in the first polymer mixture, the weight ratio of the first hydrophobic polymer to the first hydrophilic polymer is 1:0.02-1.

4. The bifunctional film as claimed in claim 1, wherein the first hydrophilic polymer is hyaluronic acid or a combination of hyaluronic acid and polyvinyl alcohol.

5. The bifunctional film as claimed in claim 4, wherein in the first polymer mixture, the weight ratio of the first hydrophobic polymer to the first hydrophilic polymer is 1:0.025-1.

6. The bifunctional film as claimed in claim 1, wherein the first hydrophobic polymer is polycaprolactone and the first hydrophilic polymer polymer is hyaluronic acid, and in the first polymer mixture, the weight ratio of the polycaprolactone to the hyaluronic acid is 1:0.01-1.

7. The bifunctional film as claimed in claim 1, wherein the first hydrophobic polymer is polycaprolactone and the first hydrophilic polymer is a combination of hyaluronic acid and polyvinyl alcohol, and in the first polymer mixture, the weight ratio of the polycaprolactone, the hyaluronic acid and the polyvinyl alcohol is 1:0.01-1:0.01-1.

8. The bifunctional film as claimed in claim 1, wherein the second hydrophilic polymer is gelatin, a modified gelatin, carboxymethyl cellulose (CMC) or collagen.

9. The bifunctional film as claimed in claim 8, wherein the modified gelatin comprises a gelatin modified with dihydroxyphenyl-alanine (DOPA) (gelatin-DOPA) or a gelatin modified with glutaraldehyde (GA) (gelatin-GA).

10. The bifunctional film as claimed in claim 1, further comprising an intermediate layer between the anti-adhesion layer and the attachment layer, wherein the intermediate layer comprises a second polymer mixture, and the second polymer mixture comprises:

a second hydrophobic polymer which is at least one hydrophobic polymer selected from the group consisting of: polycaprolactone, polylactic acid, poly(lactic-co-glycolic acid), poly(glycolic acid), polyhydroxybutyrate, polydioxanone, poly(propylene fumarate), polyanhydrides, polyacetals, poly(ortho esters), polycarbonates, polyurethanes, polyphosphazenes and polyphosphoester; and a third hydrophilic polymer which is at least one hydrophilic polymer selected from the group consisting of: gelatin, a modified gelatin, alginate, polyvinyl alcohol, carboxymethyl cellulose, polyethylene glycol, a derivative of polyethylene glycol, collagen, demineralized bone matrix, bone morphogenetic protein, albumin, chitosan, fibrin, polyoxyethylene and polyvinylpyrrolidone, and wherein in the second polymer mixture, a weight ratio of the second hydrophobic polymer to the third hydrophilic polymer is 1:0.005-5.

11. The bifunctional film as claimed in claim 10, wherein the second hydrophobic polymer is polycaprolactone, polylactic acid or poly(lactic-co-glycolic acid).

12. The bifunctional film as claimed in claim 10, wherein the third hydrophilic polymer is gelatin or collagen.

* * * * *